United States Patent
Kaneto

(10) Patent No.: US 10,372,059 B2
(45) Date of Patent: Aug. 6, 2019

(54) LENS UNIT, OPTICAL HEAD AND IMAGE FORMATION APPARATUS

(71) Applicant: Oki Data Corporation, Tokyo (JP)

(72) Inventor: Taishi Kaneto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/787,890

(22) Filed: Oct. 19, 2017

(65) Prior Publication Data

US 2018/0113395 A1    Apr. 26, 2018

(30) Foreign Application Priority Data

Oct. 21, 2016  (JP) .................................. 2016-206481

(51) Int. Cl.
*G03G 15/04* (2006.01)
*G02B 3/00* (2006.01)
*G03G 15/043* (2006.01)

(52) U.S. Cl.
CPC ......... *G03G 15/0409* (2013.01); *G02B 3/005* (2013.01); *G02B 3/0075* (2013.01); *G03G 15/0435* (2013.01); *G03G 15/04045* (2013.01)

(58) Field of Classification Search
CPC .. G03G 15/04; G03G 15/011; G03G 15/0409; G03G 15/04036; G03G 15/04045; G03G 15/04054; G03G 15/04063; G03G 21/1666; G03G 2215/04; G03G 2215/0402; G03G 2215/0407; G03G 2215/0409; G03G 2215/0412; G03G 2215/0414; G03G 2221/1636; G02B 3/005; G02B 3/0006; G02B 3/0037; G02B 3/0075; G02B 7/025; B41J 2/45; B41J 2/435; B41J 2/447

See application file for complete search history.

(56) References Cited

U.S. PATENT DOCUMENTS

| | | | |
|---|---|---|---|
| 2014/0098171 A1* | 4/2014 | Tanigawa ......... | G03G 15/04054 347/118 |
| 2015/0234307 A1* | 8/2015 | Matsuo .............. | G03G 15/0435 347/118 |

FOREIGN PATENT DOCUMENTS

JP    2016-068453 A    5/2016

* cited by examiner

*Primary Examiner* — Thomas S Giampaolo, II
(74) *Attorney, Agent, or Firm* — Metrolex IP Law Group, PLLC

(57) ABSTRACT

A lens unit according to an embodiment includes: a lens array that includes lens elements each provided with an optical axis and extends in a first direction; a support member that supports the lens array; and an adhesive that bonds the lens array and the support member. The support member includes a first adhesive holding portion with a specified depth in a direction of the optical axis and a second adhesive holding portion shallower than the first adhesive holding portion. The first adhesive holding portion and the second adhesive holding portion are aligned in the first direction. The adhesive is arranged at the first adhesive holding portion and the second adhesive holding portion.

19 Claims, 19 Drawing Sheets

LENS UNIT, OPTICAL HEAD AND IMAGE FORMATION APPARATUS

CROSS REFERENCE TO RELATED APPLICATIONS

This application claims priority based on 35 USC 119 from prior Japanese Patent Application No. 2016-206481 filed on Oct. 21, 2016, entitled "LENS UNIT, OPTICAL HEAD AND IMAGE FORMATION APPARATUS", the entire contents of which are incorporated herein by reference.

BACKGROUND

This disclosure relates to a lens unit having a lens array in which lens elements are aligned, and an optical head and image formation apparatus each including the lens unit.

Print heads of image formation apparatuses or the like use a lens unit having a lens array in which lens elements (for example, rod lenses) are aligned in one direction (for example, Patent Literature 1).

Patent Literature 1: Japanese Patent Application Publication No. 2016-68453 (FIGS. 3 to 5)

SUMMARY

In recent years, along with downsizing and cost reduction of image formation apparatuses, downsizing of lens units has been advancing. Along with this trend, a technique is being desired which can downsize lens units without deteriorating the optical performance.

An object of an embodiment is to downsize a lens unit without deteriorating the optical performance.

A first aspect of the present disclosure is a lens unit that includes: a lens array that includes lens elements each provided with an optical axis and extends in a first direction; a support member that supports the lens array; and an adhesive that bonds the lens array and the support member. The support member includes a first adhesive holding portion with a depth in a direction of the optical axis and a second adhesive holding portion shallower than the first adhesive holding portion. The first adhesive holding portion and the second adhesive holding portion are arranged in the first direction. The adhesive is provided at the first adhesive holding portion and the second adhesive holding portion.

A second aspect of the present disclosure is an optical head that includes: the lens unit according to the first aspect; and a substrate including an optical element facing the lens unit.

A third aspect of the present disclosure is an image formation apparatus that includes: the optical head according to the second aspect; an image carrier on which a latent image is formed by light exposure by the optical head; and a development unit that develops the latent image.

According to the above aspect(s), since the lens array is fixed at the bonding portions arranged at the first adhesive holding portion and the second adhesive holding portion having different depths in the optical axis direction, it is possible to suppress the twist of the lens array. As a result, it is possible to suppress deterioration of the optical performance (for example, deviation of each lens element in the optical axis direction).

DETAILED DESCRIPTION

Figure 1:
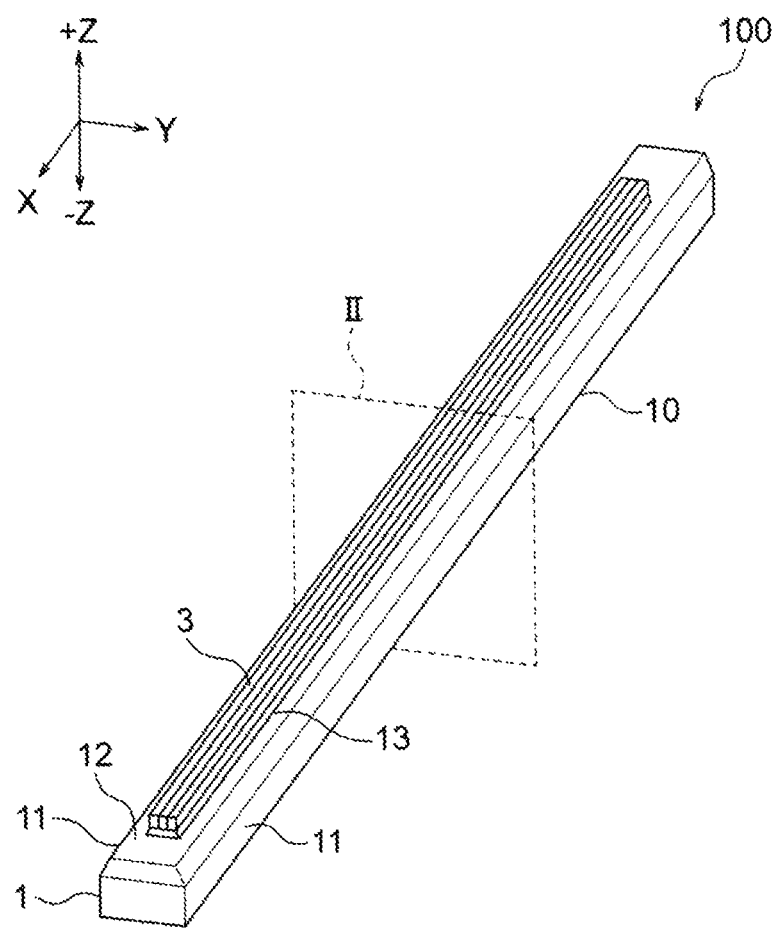
FIG. 1 is a perspective view illustrating a print head having a lens unit of a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Figure 2:
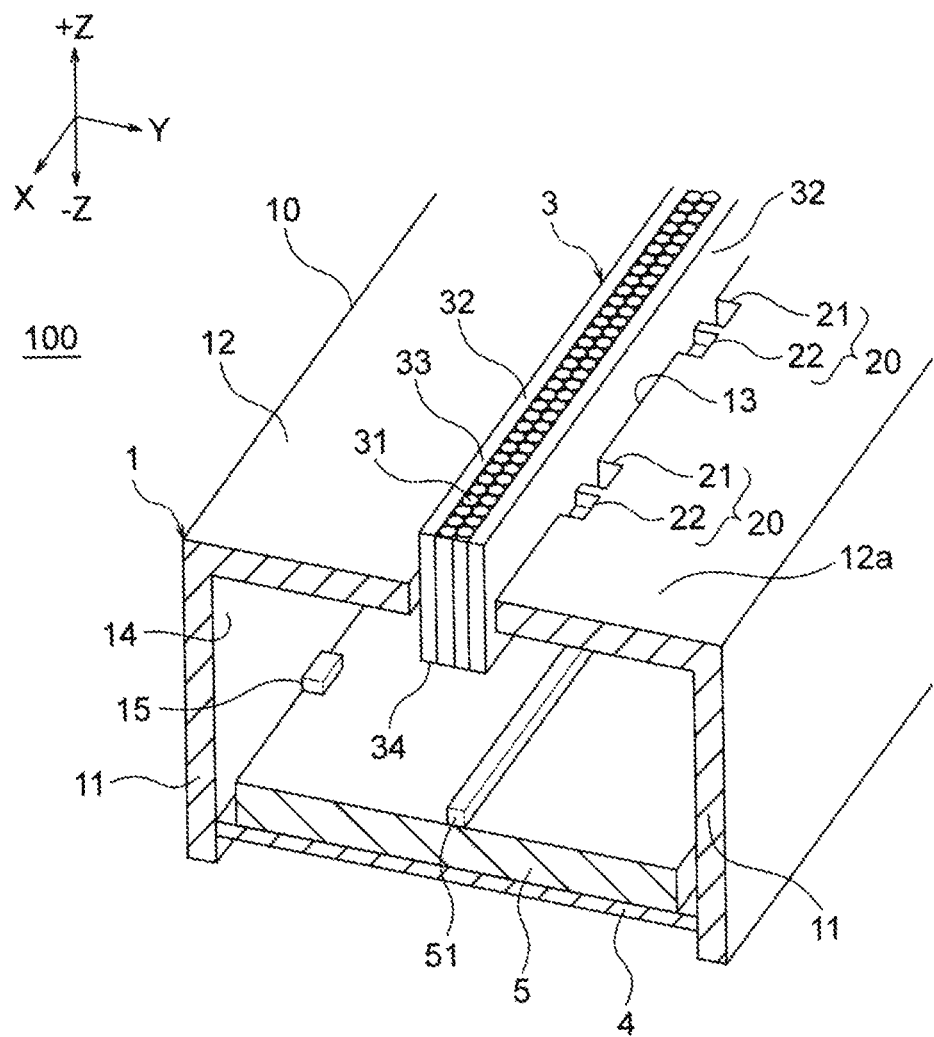
FIG. 2 is a partial cross-sectional perspective view of the print head of the first embodiment.
Figure 19:
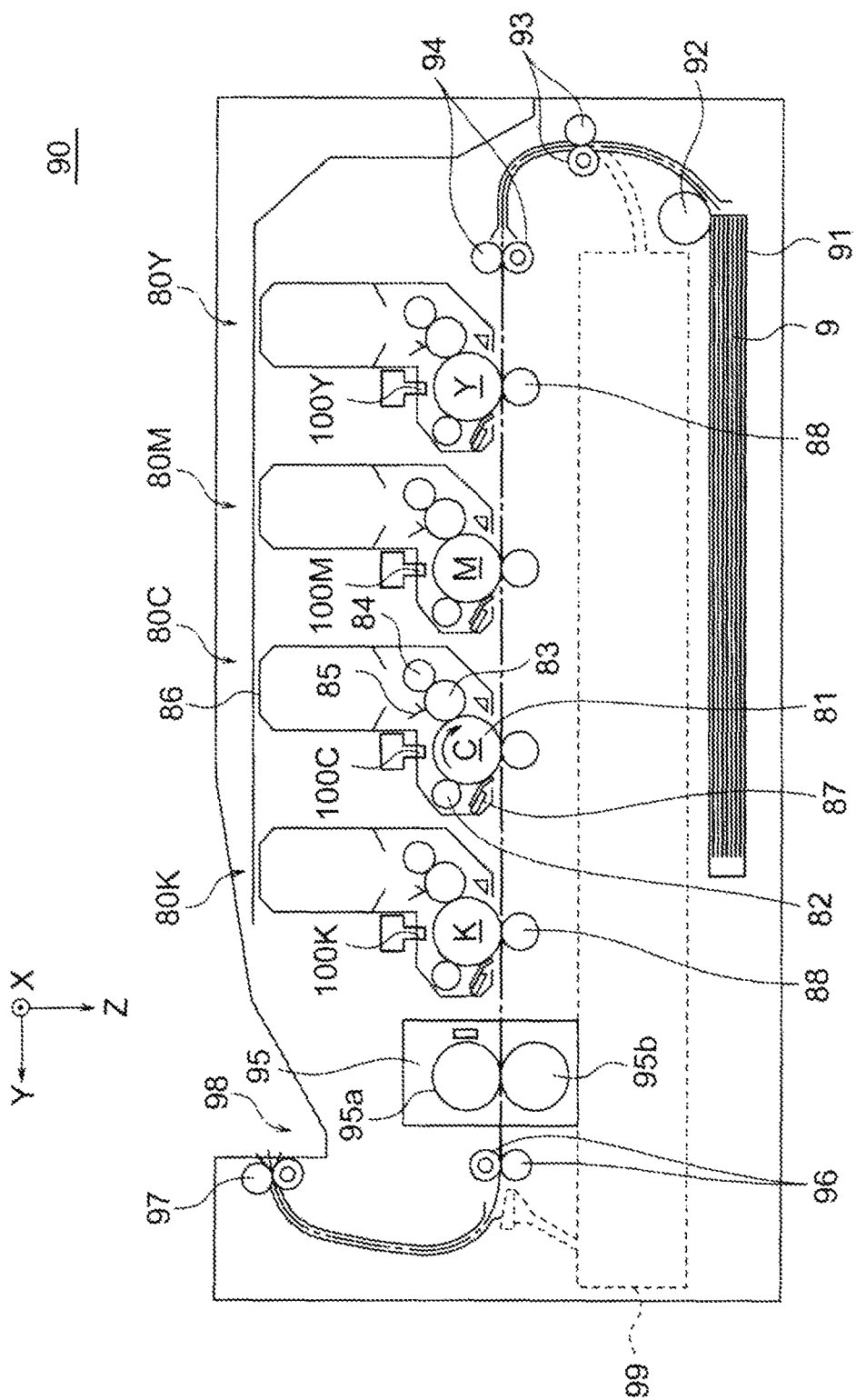
FIG. 19 is a diagram illustrating the basic configuration of an image formation apparatus to which the lens unit of each embodiment is applicable.

First, a first embodiment is described. FIG. 1 is a perspective view illustrating a print head 100 as an optical head having a lens unit 10 of the first embodiment. FIG. 2 is a partial cross-sectional perspective view of the print head 100 taken along plane II indicated in FIG. 1. Note that the print head 100 is used, for example, as an exposure apparatus for forming an electrostatic latent image in an image formation apparatus 90 (FIG. 19).

As illustrated in FIG. 1, the entire print head 100 (LED head) has a long shape in one direction. As illustrated in FIG. 2, the print head 100 includes a lens array 3 in which lens elements 31 are aligned in a direction orthogonal to their optical axis, a mounting substrate 5 arranged opposite to the lens array 3 in the optical axis direction, and a support member 1 holding the lens array 3 and the mounting substrate 5. Of these, the lens array 3 and the support member 1 supporting the lens array 3 are included in the lens unit 10.

Hereinafter, the optical axis direction of the lens elements 31 is referred to the Z direction, and the aligning direction (main scanning direction) of the lens elements 31 is referred to the X direction. A direction (sub scanning direction) orthogonal to both the Z direction and the X direction is referred to the Y direction. As for the Z direction, the direction from the mounting substrate 5 toward the lens array 3 is referred to the +Z direction, and the opposite direction is referred to the −Z direction.

In the lens array 3, the lens elements (rod lenses) 31 are aligned in two rows in the X direction, and are sandwiched and held between a pair of side plates 32 from both sides in the Y direction. The end surface of the lens array 3 on the +Z side is called an exit side end surface 33, and the end surface on the −Z side is called an incidence side end surface 34.

Here, the length of the lens array 3 in the X direction (main scanning direction) is 297 mm (equivalent to A3 size), the width in the Y direction (sub scanning direction) 1.2 mm, and the height in the Z direction (optical axis direction) 4.4 mm. Note that these dimensions are merely an example, and can be changed as appropriate depending on the paper size and other factors.

Here, the lens element 31 is a gradient index lens, but the disclosure is not limited to gradient index lenses. Here, the lens elements 31 are aligned in two rows in a staggered manner, but they may be aligned in one row. The side plates 32 are plates member with the board surfaces parallel to the XZ plane, and are made of resin. The length of the side plates 32 in the Z direction is the same as that of the lens elements 31 in the Z direction.

The support member 1 has a pair of side walls 11 facing each other in the Y direction and a flat plate 12 (lens array support) connecting the ends of the side walls 11 in the +Z direction. The flat plate 12 is a flat plate portion the plate surface of which is parallel to the XY plane. Formed in the center in the Y direction of the flat plate 12 is an insertion hole 13 (opening) for attaching the lens array 3. The insertion hole 13 is a slot extending in the X direction, and passes through the flat plate 12 in the Z direction. The support member 1 can be, for example, a molded body of resin, a part made by bending a structural steel, a metal cut part, or the like.

In the area 14 inside the pair of the side walls 11, the mounting substrate 5 is held at a certain distance from the lens array 3 in the Z direction. On the inner surface of each side wall 11, contact portions 15 which come in contact with the surface of the mounting substrate 5 on the +Z side are formed so as to protrude inward in the Y direction.

The mounting substrate 5 is a substantially rectangular substrate having the length in the X direction and the width in the Y direction. Substantially at the center of the mounting substrate 5 in the Y direction, light emitting elements 51 (a light emitting element array chip) as optical elements are aligned in a row in the X direction. The light emitting element 51 is, for example, a light emitting diode (LED), a light emitting thyristor, or the like. Also mounted on the mounting substrate 5 is a drive circuit for driving the light emitting elements 51.

On the −Z side of the mounting substrate 5, a back-surface attachment member 4 is arranged for attaching the mounting substrate 5 to the support member 1. The back-surface attachment member 4 has protrusions that engage with engagement holes provided in the pair of the side walls 11 of the support member 1. The back-surface attachment member 4 is attached to the support member 1 and presses the mounting substrate 5 such that the top surface (surface on the +Z side) of the mounting substrate 5 comes in contact with the contact portions 15. Note that how to attach the mounting substrate 5 to the support member 1 is not limited to the way described above, the mounting substrate 5 may be attached in any way as long as the mounting substrate 5 can be positioned with respect to the support member 1.

Figure 3:
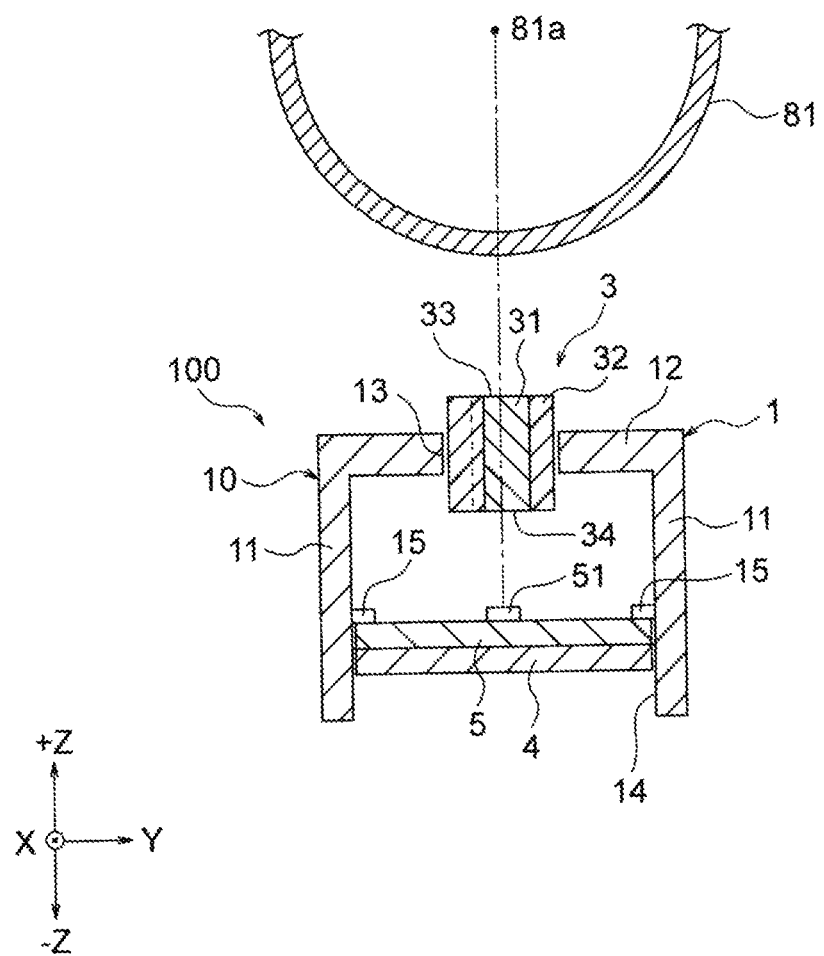
FIG. 3 is a schematic diagram illustrating the positional relationship between the print head and a photosensitive drum.

FIG. 3 is a schematic diagram illustrating the positional relationship between the print head 100 and an image forming surface (photosensitive drum 81). As illustrated in FIG. 3, the print head 100 is arranged to face the photosensitive drum 81 as an image carrier of the image formation apparatus 90 (FIG. 19). The light emitted from the light emitting element 51 on the mounting substrate 5 enters the lens element 31 of the lens array 3. The lens element 31 of the lens array 3 collects light on the surface of the photosensitive drum 81.

Here, the lens array 3 and the mounting substrate 5 are positioned in the Z direction such that the distance from the light emitting element 51 to the incidence side end surface 34 of the lens array 3 is equal to the focal length of the lens element 31, and attached to the support member 1.

Figure 4:
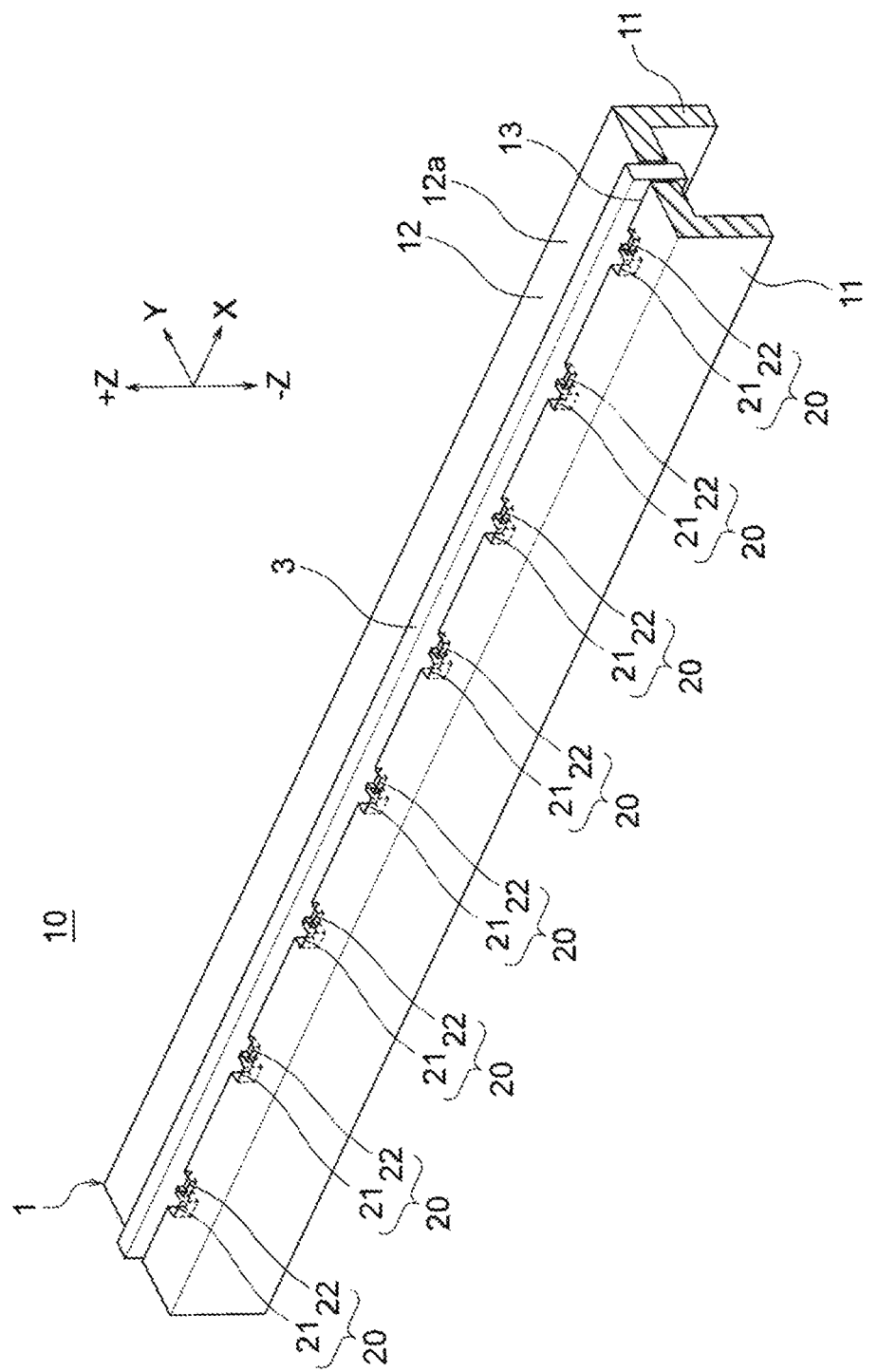
FIG. 4 is a perspective view illustrating the lens unit.
Figure 5:
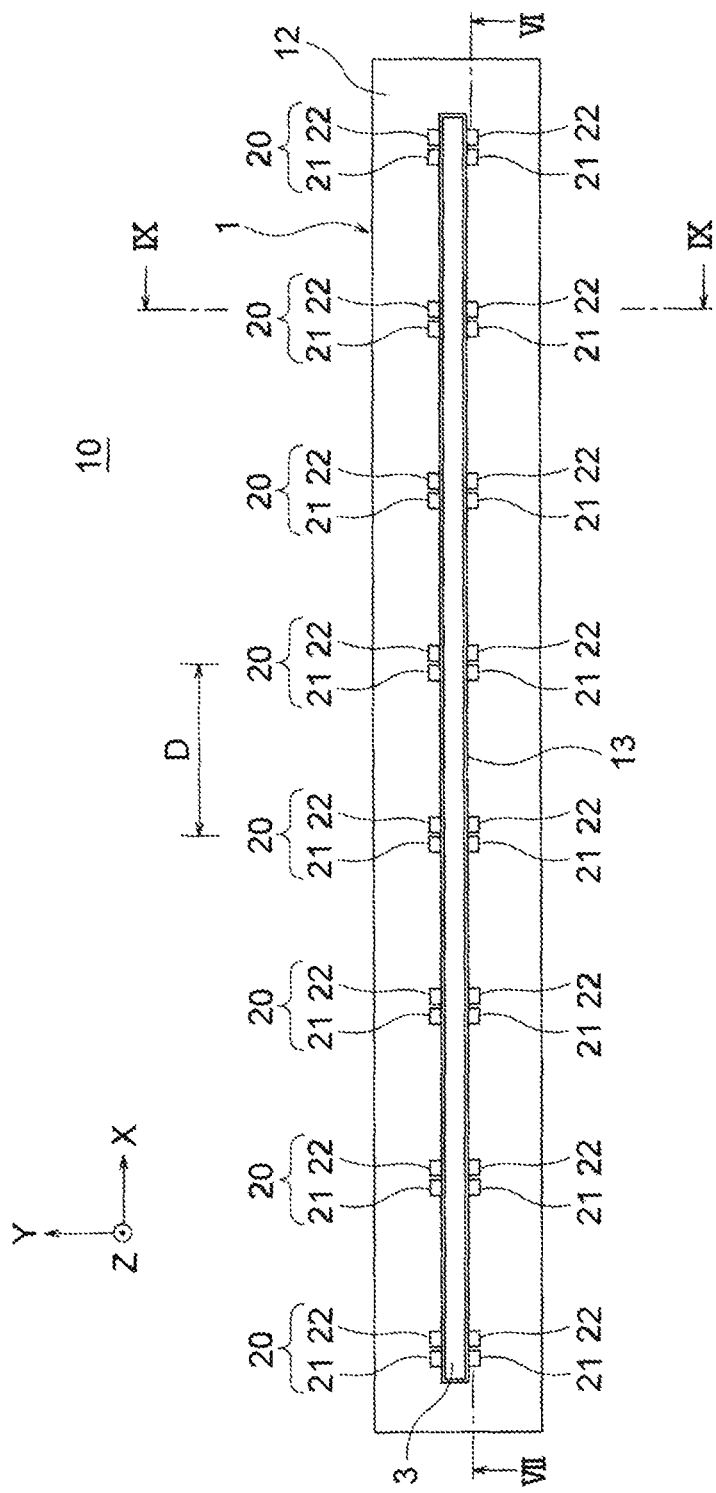
FIG. 5 is a plan view illustrating the lens unit.

Next, descriptions are provided for the configuration for fixing the lens array 3 to the support member 1. FIG. 4 is a perspective view illustrating the lens unit 10. FIG. 5 is a plan view illustrating the lens unit 10. As illustrated in FIGS. 4 and 5, both sides of the insertion hole 13 in the direction Y in the support member 1, fixing portions 20 are aligned along the insertion hole 13. Alignment intervals D (FIG. 5) of the fixing portions 20 in the X direction are, for example, several tens mm.

Figure 6:
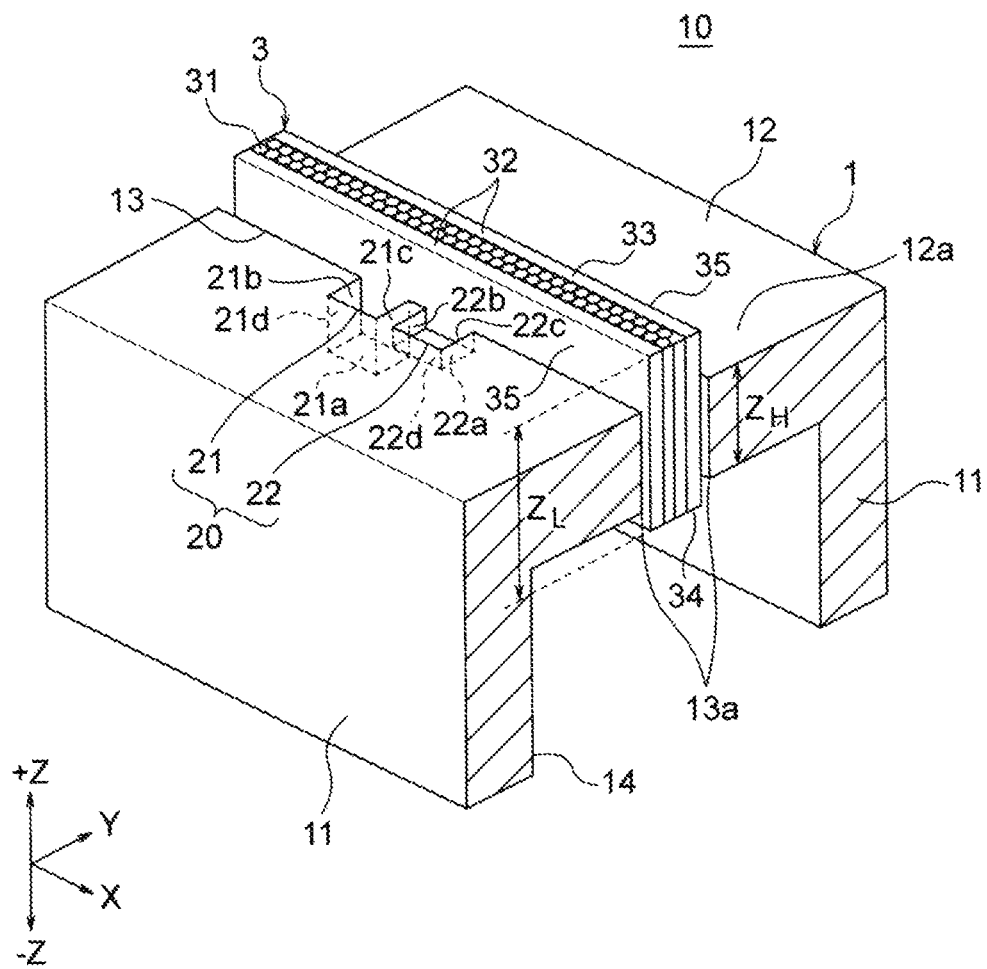
FIG. 6 is a partial cross-sectional perspective view illustrating a part of the lens unit in an enlarged manner.

FIG. 6 is a partial cross-sectional perspective view illustrating a part (part including the fixing portion 20) of the lens unit 10 in an enlarged manner. The fixing portion 20 has a first recessed portion 21 (first adhesive holding portion) and a second recessed portion 22 (second adhesive holding portion) adjacent to each other in the X direction. The depths (the lengths in the Z direction) of the first recessed portion 21 and the second recessed portion 22, which opens in the surface on the +Z side of the flat plate 12 (hereinafter referred to as a surface 12a), are different from each other. In addition, the first recessed portion 21 and the second recessed portion 22 also open in the inner surface 13a of the insertion hole 13.

At least one set of the first recessed portion 21 and the second recessed portion 22 is arranged within a range of a predetermined length (for example, 10 mm) in the X direction. It is desirable that each length in the X direction of the first recessed portion 21 and the second recessed portion 22 be in a range of 1 to 3 mm, and here it is 2 mm. Note that here, the lengths in the X direction of the first recessed portion 21 and the second recessed portion 22 are the same, but they may be different. In addition, here, the lengths in the Y direction of the first recessed portion 21 and the second recessed portion 22 are the same, but they may be different.

The first recessed portion 21 has a bottom surface 21a located at the end in the −Z direction, a side surface 21b located at the end in the −X direction, a side surface 21c located at the end in the +X direction, and an opposing surface 21d located at the outer end in the Y direction. The bottom surface 21a is parallel to the XY plane, the side surfaces 21b and 21c are parallel to the YZ plane, and the opposing surface 21d is parallel to the XZ plane. The depth of the first recessed portion 21 described above is the distance from the top surface 12a of the flat plate 12 to the bottom surface 21a in the Z direction.

The second recessed portion 22 has a bottom surface 22a located at the end in the −Z direction, a side surface 22b located at the end in the −X direction, a side surface 22c located at the end in the +X direction, and an opposing surface 22d located at the outer end in the Y direction. The bottom surface 22a is parallel to the XY plane, the side surfaces 22b and 22c are parallel to the YZ plane, and the opposing surface 22d is parallel to the XZ plane. The depth of the second recessed portion 22 described above is the distance from the top surface 12a of the flat plate 12 to the bottom surface 22a in the Z direction.

Figure 7:
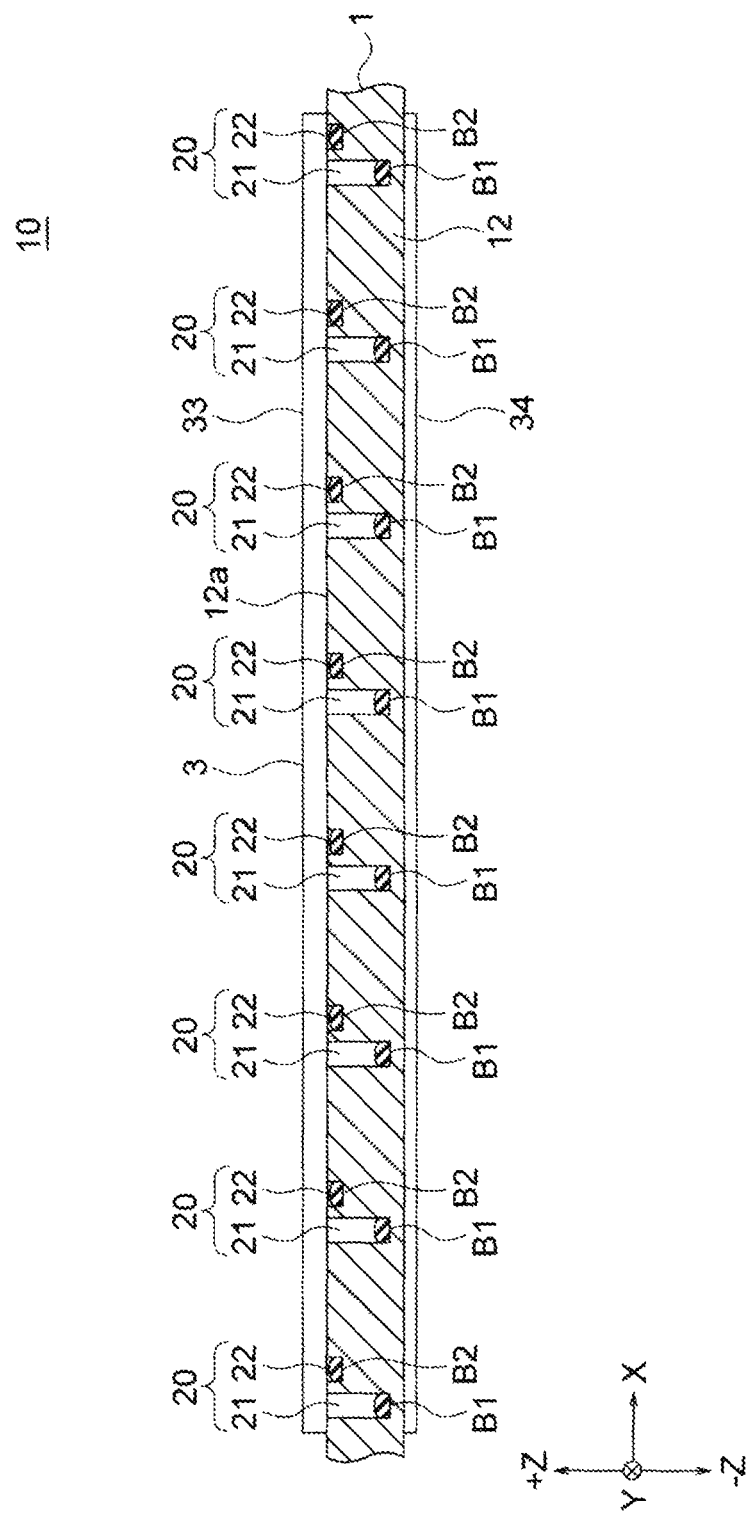
FIG. 7 is a longitudinal cross-sectional view illustrating the lens unit.
Figure 8:
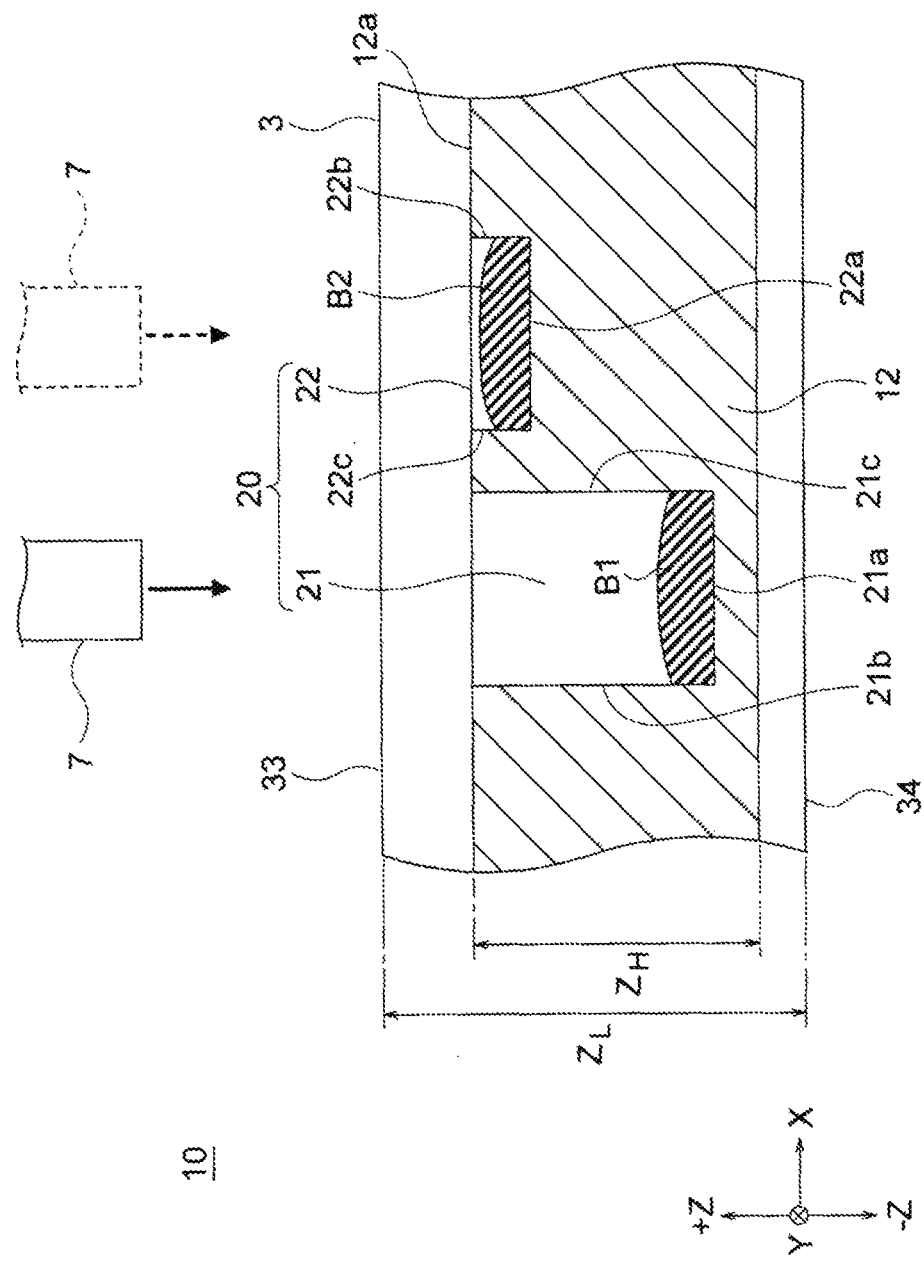
FIG. 8 is a cross-sectional view of a part of the lens unit in an enlarged manner.

FIG. 7 is a cross-sectional view taken along line VII-VII indicated in FIG. 5, in the direction of the arrow. FIG. 8 is a cross-sectional view of a part (portion including the fixing portion 20) of the lens unit 10 in an enlarged manner. As illustrated in FIG. 7, arranged in the first recessed portion 21 of the fixing portion 20 is an adhesive B1, and in the second recessed portion 22 an adhesive B2. Note that they are referred to as adhesives B1 and B2 for convenience of explanation, but these are the same adhesives.

The adhesives B1 and B2 are applied, for example, with a dispenser nozzle 7 (FIG. 8). The dispenser nozzle 7 drops a liquid adhesive from a nozzle having an inner diameter of 1 mm or less (for example, 0.7 mm).

Since the first recessed portion 21 and the second recessed portion 22 open in the top surface 12a of the flat plate 12 as described above, locating the dispenser nozzle 7 on the +Z side (the upper side in the figure) of the flat plate 12 makes it possible to apply the adhesives to the first recessed portion 21 and the second recessed portion 22 from the dispenser nozzle 7.

In addition, since the first recessed portion 21 and the second recessed portion 22 open in an inner surface 13a of the insertion hole 13, the adhesive B1 in the first recessed portion 21 and the adhesive B2 in the second recessed portion 22 come in contact with the side surface (end surface in the Y direction) of the lens array 3.

The adhesives B1 and B2 are, for example, ultraviolet curable adhesives. By irradiating the adhesive B1 in the first recessed portion 21 and the adhesive B2 in the second recessed portion 22 with ultraviolet rays from the +Z side of the flat plate 12 of the support member 1, the adhesives B1 and B2 are cured.

It is desirable that the thicknesses in the Z direction of the adhesive B1 in the first recessed portion 21 and the adhesive B2 in the second recessed portion 22 be in a range of 1 to 2 mm. If the thicknesses of the adhesives B1 and B2 are in this range, it is possible to sufficiently cure the adhesives B1 and B2 in several seconds to a little over ten seconds of ultraviolet irradiation time.

With this configuration, the lens array 3 is fixed to the support member 1 with the adhesives B1 and B2 at the fixing portions 20 (the first recessed portions 21 and the second recessed portions 22) arranged on both sides of the insertion hole 13 in the Y direction and at multiple positions along the longitudinal direction of the insertion hole 13.

Next, descriptions are provided for the operation and effects of the lens unit 10 of the first embodiment. In the lens unit 10 of this first embodiment, the first recessed portion 21 and the second recessed portion 22 with different depths are provided in the support member 1, and the adhesives B1 and B2 are arranged in these first recessed portion 21 and second recessed portion 22, so that the lens array 3 is held with the twist around the axis in the X direction suppressed. The following explains this point.

Since the lens array 3 is long in the X direction as described above, twisting around the axis in the X direction is likely to occur. For example, it is known that in the case where the length in the X direction of the lens array 3 is 297 mm (A3 size), the width in the Y direction 1.2 mm, and the height in the Z direction 4.4 mm, a twist of 1 to 1.5 degrees occurs in the rotation direction around the axis in the X direction at both ends of the lens array 3 in the X direction.

A latent image should originally be formed linearly in the X direction (main scanning direction) on the image carrier (photosensitive drum 81 illustrated in FIG. 3). However, if the lens array 3 is twisted, the position at which the latent image is formed would change. In a color image formation apparatus (color printer), if the forming position of the latent image for each color differs, it causes color misregistration.

In addition, if the lens array 3 is twisted, variations occur in the latent image shape for each dot (the spot shape of the light beam) corresponding to each light emitting element 51, causing unevenness in the form of streaks or bands in the Y direction (sub scanning direction).

In addition, if the lens array 3 is twisted, the incident surface of the lens element 31 and the light emitting elements 51 do not accurately face each other. As a result, the amount of light entering the lens array 3 decreases. Consequently, it is necessary to lengthen the exposure time to obtain an amount of light necessary to form a latent image, which hinders the improvement of image forming speed.

Because the attaching position of the mounting substrate 5 to the support member 1 varies by about ±100 μm, the attaching position of the mounting substrate 5 is adjusted in the Y direction after the mounting substrate 5 is attached to the support member 1. However, it is difficult to adjust also the twist of the lens array 3 in this adjustment.

In particular, in recent years, the width of the lens array 3 in the Y direction tends to be small along with downsizing and cost reduction of image formation apparatuses, countermeasures against twisting as described above have been desired.

To deal with this, in the lens unit 10 of the first embodiment, the first recessed portion 21 having a depth in the Z direction and the second recessed portion 22 the depth of which is smaller than the first recessed portion 21 are formed in the support member 1, and the adhesives B1 and B2 are arranged in these first recessed portion 21 and second recessed portion 22. These first recessed portion 21 and second recessed portion 22 (fixing portions 20) are arranged on both sides in the Y direction of the insertion hole 13 where the lens array 3 is attached, and at multiple positions in the X direction.

By fixing the lens array 3 with the adhesives B1 and B2 arranged in the first recessed portion 21 and the second recessed portion 22 having different depths (positions in the Z direction) as described above, it is possible to efficiently suppress the twist of the lens array 3 around the axis in the X direction, compared to the case where the lens array 3 is fixed only at the same positions in the Z direction.

Therefore, if the print head 100 having this lens unit 10 is applied to the image formation apparatus 90, it is possible to keep high the accuracy of the relative position between the light emitting elements 51 and the lens array 3. In other words, it is possible to let the light emitting elements 51 on the mounting substrate 5 face the incident surface of the lens elements 31 of the lens array 3 accurately.

This suppresses the deviation of the position where latent images are formed on the image carrier (the photosensitive drum 81 illustrated in FIG. 3), which in turn suppresses the color misregistration in color image formation apparatuses.

In addition, since variations in the latent image shape corresponding to each light emitting element 51 can be suppressed, it is possible to suppress occurrence of unevenness in the form of streaks or bands and keep image quality. In addition, since the decrease in the amount of light entering the lens array 3 is suppressed, the number of factors that may hinder improvements in printing speed is reduced. Consequently, it is possible to keep the performance of the image formation apparatus, while reducing the production cost.

In this first embodiment, the application of adhesives and the ultraviolet irradiation to the support member 1 only need to be performed from one side (+Z side). Hence, for example, compared to the case where the application of adhesives and the ultraviolet irradiation to the support member 1 are performed from both sides in the Z direction, it is possible to simplify the production process and reduce the production cost.

If the entire periphery of the lens array 3 is bonded to the support member 1, the ultraviolet irradiation energy necessary for curing the adhesives increases, resulting in the increase of the production cost in mass production. In contrast, since in this first embodiment, the lens array 3 only needs to be bonded at the fixing portions 20 arranged on both sides in the Y direction of the insertion hole 13, and at multiple positions at intervals in the X direction, it is possible to suppress the increase of the production cost also in mass production.

Further, it is desirable that the first recessed portion 21 and the second recessed portion 22 (fixing portions 20) in the first embodiment be arranged as follows.

It is desirable that the first recessed portion 21 and the second recessed portion 22 be as close in the X direction as possible. Specifically, it is desirable that they be as close as, for example, within about several millimeters. By bringing first recessed portion 21 and the second recessed portion 22 close to each other in the X direction, it is possible to enhance the effect of holding the lens array 3 with the twist being corrected. In addition, this makes it possible to irradiate the adhesives B1 and B2 with the ultraviolet rays at the same time, which in turn reduces the irradiation time.

In addition, as for the fixing portions 20 (the first recessed portions 21 and the second recessed portions 22) arranged on both sides in the Y direction of the insertion hole 13, it is desirable that the first recessed portions 21 face each other in the Y direction and the second recessed portions 22 face each other in the Y direction.

Figures 9A, 9B:
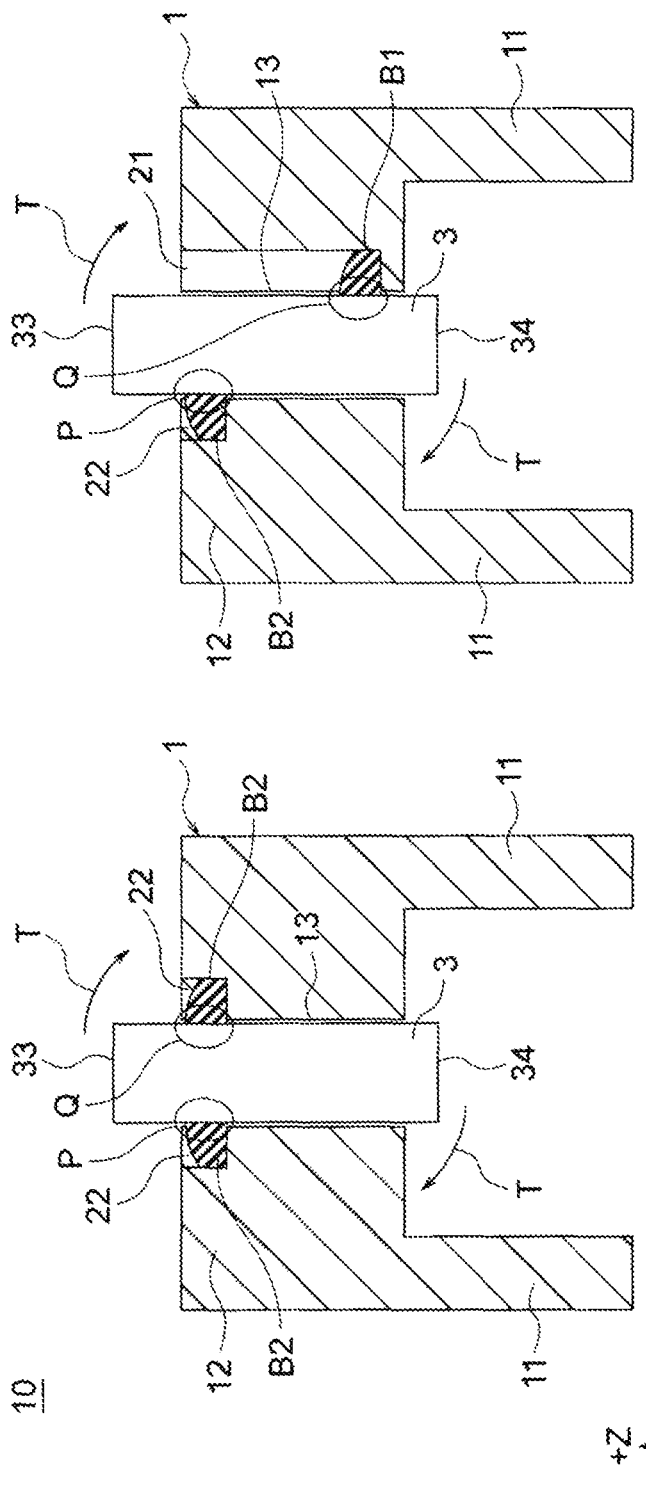
FIG. 9A is a longitudinal cross-sectional view of the lens unit and FIG. 9B is a transverse cross-sectional view of a lens unit of another configuration example.

FIG. 9A is a cross-sectional view in the arrow direction taken along line IX-IX indicated in FIG. 5. FIG. 9B is a transverse cross-sectional view of a lens unit of another configuration example. In this first embodiment as illustrated in FIG. 9A, the first recessed portions 21 face each other in the Y direction, and the second recessed portions 22 face each other in the Y direction, with the insertion hole 13 in between (FIG. 9A only illustrates the second recessed portions 22). In contrast, in the other configuration illustrated in FIG. 9B, the first recessed portion 21 and the second recessed portion 22 face each other in the Y direction with the insertion hole 13 in between.

Since the lens array 3 is likely to twist as described above, the lens array 3 is fixed to the support member 1 in the state where the twist is corrected such that the optical axis direction of each lens element 31 is oriented in the right direction. Hence, when the states of adhesives B1 and B2 are changed (softening, curing, or the like), for example, because of changes in temperature and humidity, the lens array 3 may have a tendency to return to the twisted state before the correction.

For this reason, in the case where the first recessed portion 21 and the second recessed portion 22 face each other in the Y direction with the insertion hole 13 in between as the configuration example illustrated in FIG. 9B, the adhesives cannot resist the torque T with which the lens array 3 tries to return to the twisted state, and a separation may occur at the contact portions P and Q between the adhesive B1 in the first recessed portion 21 and the adhesive B2 in the second recessed portion 22 and the lens array 3.

In contrast, in the first embodiment as illustrated in FIG. 9A, since the first recessed portions 21 face each other in the Y direction and the second recessed portions 22 face each other in the Y direction, with the insertion hole 13 in between, the adhesives can resist the torque with which the lens array 3 tries to return to the twisted state. As a result, it is possible to prevent the separation at the contact portions P and Q between the adhesive B1 in the first recessed portion 21 and the adhesive B2 in the second recessed portion 22 and the lens array 3. This makes it possible to hold the lens array 3 in the state where the twist is corrected.

Figure 10:
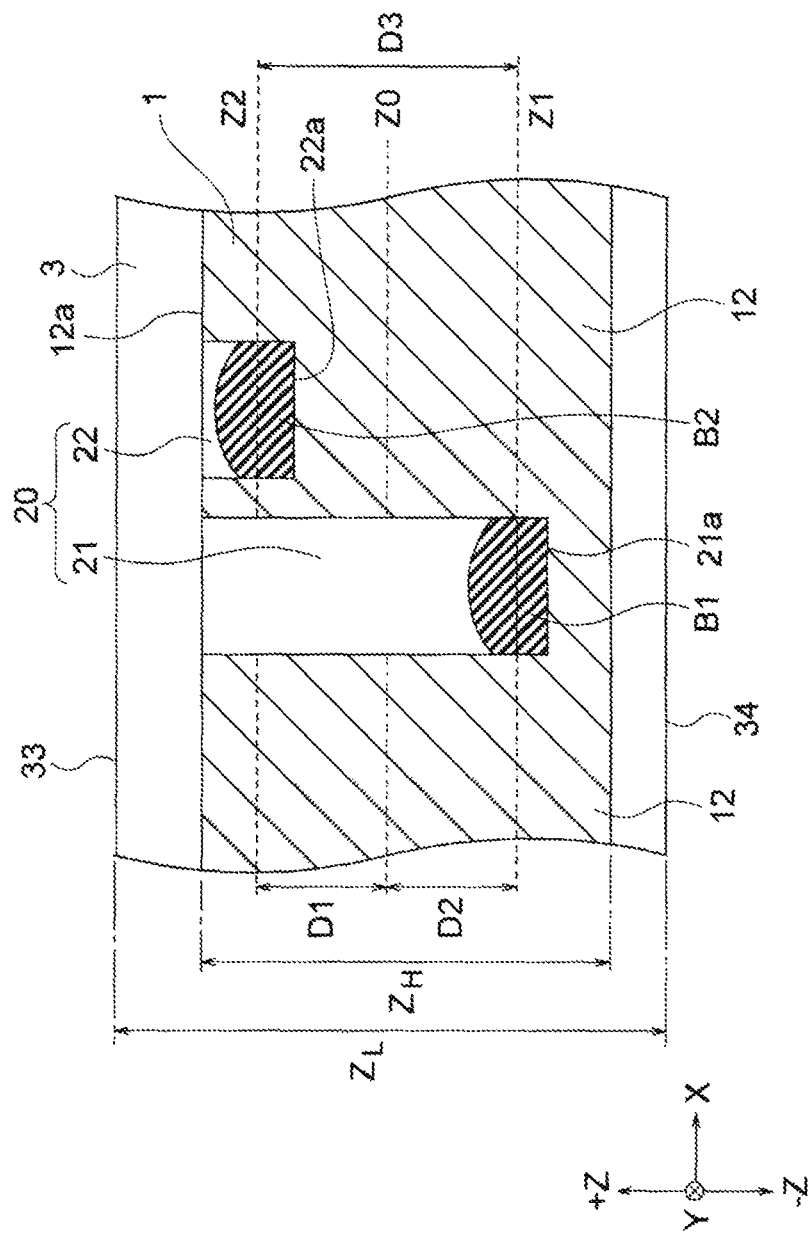
FIG. 10 is a schematic view for explaining respective bonding points in the first recessed portion and the second recessed portion of the first embodiment.

FIG. 10 is a cross-sectional view for explaining the arrangement in the Z direction of the adhesive B1 in the first recessed portion 21 and the adhesive B2 in the second recessed portion 22. In FIG. 10, the symbol $Z_L$ indicates the dimension (length) in the Z direction of the lens array 3. The symbol $Z_H$ indicates the dimension (thickness) in the Z direction of the flat plate 12 of the support member 1.

In addition, Z1 is the center position (also referred to as the bonding position) in the Z direction of the adhesive B1 in the first recessed portion 21. Similarly, Z2 is the center position (also referred to as the bonding position) in the Z direction of the adhesive B2 in the second recessed portion 22. Z0 is the center position in the Z direction of the lens array 3, in other words, the center position between the exit side end surface 33 and incidence side end surface 34 of the lens array 3.

It is desirable that the distance D1 from the center position Z0 of the lens array 3 to the center position Z1 of the adhesive B1 in the first recessed portion 21 and the distance D2 from the center position Z0 of the lens array 3 to the center position Z2 of the adhesive B2 in the second recessed portion 22 be the same as each other. In other words, it is desirable that the center position Z1 of the adhesive B1 in the first recessed portion 21 and the center position Z2 of the adhesive B2 in the second recessed portion 22 be equidistant from the center position Z0 of the lens array 3.

In addition, it is desirable that the above distances D1 and D2 be as large as possible. In other words, it is desirable that the adhesive B1 in the first recessed portion 21 and the adhesive B2 in the second recessed portion 22 be arranged as far from each other in the Z direction as possible.

Specifically, it is desirable that the center position Z1 of the adhesive B1 in the first recessed portion 21 and the center position Z2 of the adhesive B2 in the second recessed portion 22 be apart from each other, for example, by ½ to ⅔ the length $Z_L$ in the Z direction of the lens array 3. In other words, it is desirable that the distance D3 in the Z direction between the center position Z1 of the adhesive B1 in the first recessed portion 21 and the center position Z2 of the adhesive B2 in the second recessed portion 22 be within a range of $\frac{1}{2} \times Z_L$ to $\frac{2}{3} \times Z_L$.

As described above, by arranging the adhesive B1 in the first recessed portion 21 and the adhesive B2 in the second recessed portion 22 to be equidistant from the center position Z0 in the Z direction of the lens array 3 and to be as far in the Z direction as possible (for example, at least $\frac{1}{2} \times Z_L$), it is possible to increase the moment for resisting the restoration force of the lens array 3 which returns the lens array 3 in the twisted state.

In this first embodiment, as described above, the first recessed portion 21 and the second recessed portion 22 open in the top surface 12a (that is the surface on the +Z side) of the flat plate 12 of the support member 1. Since there is no constituent on the +Z side of the flat plate 12 of the support member 1, which may interfere the process of the application of adhesives and the ultraviolet irradiation to the first recessed portion 21 and the second recessed portion 22, it is possible to improve the work efficiency and contribute to the reduction of the production cost.

Conversely, it is possible that the first recessed portion 21 and the second recessed portion 22 open on the −Z side of the flat plate 12 of the support member 1 (in other words, on the side facing the mounting substrate 5). However, in this case, since the side walls 11 and the contact portions 15 exist on the −Z side of the flat plate 12, the work efficiency of the application of the adhesives and the ultraviolet irradiation is reduced. For this reason, it is desirable that the first recessed portion 21 and the second recessed portion 22 open in the top surface 12a of the flat plate 12 of the support member 1, as described above.

Although ultraviolet irradiation is used to cure the adhesives in this first embodiment, it is possible to use visible light irradiation instead of the ultraviolet irradiation (in this case, a visible light curable adhesive is used). However, ultraviolet irradiation is more advantageous than visible light irradiation in that the ultraviolet irradiation has high surface curability (thus possible to improve the fixation accuracy) and the light source energy can be increased (thus possible to reduce the time required for production).

As described above, in the lens unit 10 of the first embodiment, the support member 1 has the first recessed portion 21 having the depth in the Z direction and the second recessed portion 22 having the depth smaller than the first recessed portion 21, and the adhesives B1 and B2 are arranged in the first recessed portion 21 and the second recessed portion 22. This configuration makes it possible to hold the lens array 3 in the state where the twist is reduced. As a result, it is possible to reduce the deviation of the optical axis of each lens element 31 of the lens array 3, and suppress the degradation of the optical performance of the lens array 3.

In addition, since the first recessed portion 21 and the second recessed portion 22 (in other words, the fixing portions 20) are arranged on both sides in the Y direction of the insertion hole 13, and also arranged at multiple positions in the X direction, it is possible to positively reduce the twist of the lens array 3.

In particular, since the first recessed portions 21 face each other in the Y direction and the second recessed portions 22 face each other in the Y direction with the insertion hole 13 in between, it is possible to enhance the effect of suppressing the twist of the lens array 3.

In addition, since the center position Z1 of the adhesive B1 in the first recessed portion 21 and the center position Z2 of the adhesive B2 in the second recessed portion 22 are arranged to be equidistant from the center position Z0 in the Z direction of the lens array 3, it is possible to further enhance the effect of suppressing the twist of the lens array 3.

In addition, since the center position Z1 of the adhesive B1 of the first recessed portion 21 and the center position Z2 of the adhesive B2 of the second recessed portion 22 are arranged to be apart from each other in the Z direction by at least ½ the length $Z_L$ in the Z direction of the lens array 3, it is possible to further enhance the effect of suppressing the twist of the lens array 3.

In addition, the first recessed portion 21 and the second recessed portion 22 open in the top surface 12a of the flat plate 12 of the support member 1, it is possible to perform the application of the adhesives and the ultraviolet irradiation to the first recessed portion 21 and the second recessed portion 22 from one side (+Z side) of the support member 1. This simplifies the production process.

In addition, using ultraviolet curable adhesive for the adhesives B1 and B2 makes it easy to cure the adhesives B1 and B2 applied in the first recessed portion 21 and the second recessed portion 22. As a result, it is possible to reduce the production cost of the lens unit 10 in mass production and obtain a stable quality.

Modification.

Figure 11:
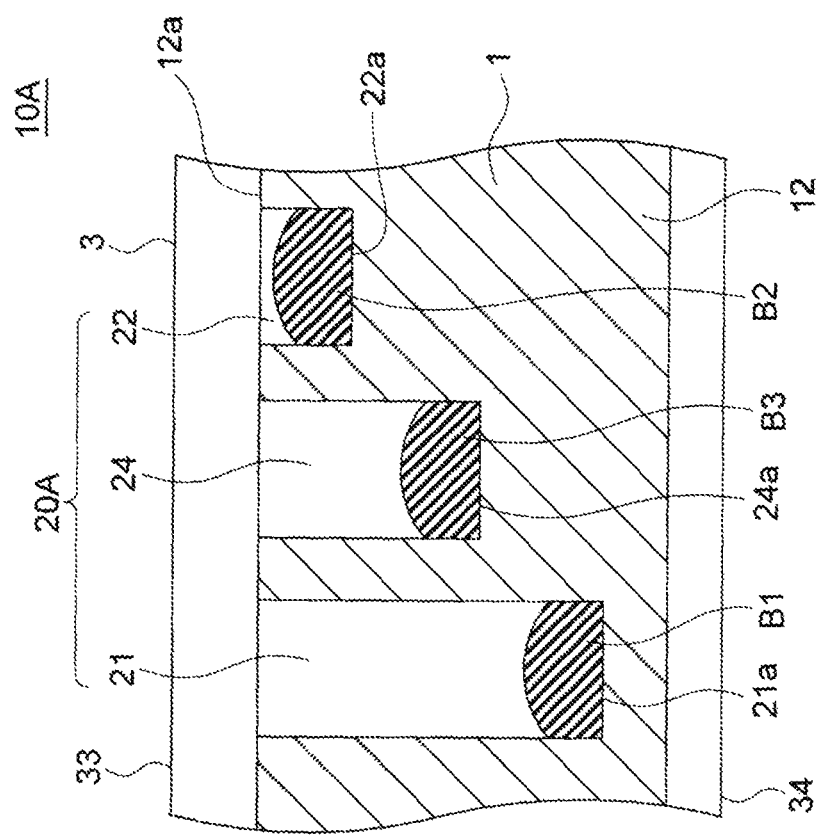
FIG. 11 is a cross-sectional view illustrating a part of a lens unit in a modification of the first embodiment in an enlarged manner.
Figure 11:
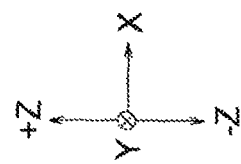

FIG. 11 is a cross-sectional view illustrating a part of the lens unit 10A in a modification of the first embodiment in an enlarged manner, taken along a plane parallel to the XZ plane. The fixing portion 20 (FIG. 8) of the lens unit 10 of the above first embodiment has the first recessed portion 21 and the second recessed portion 22 having different depths. In the modification, a fixing portion 20A of a lens unit 10A has a first recessed portion 21, a second recessed portion 22, and a third recessed portion 24 having different depths.

The first recessed portion 21 and the second recessed portion 22 are configured in the same way as in the first embodiment. The third recessed portion 24 is arranged between the first recessed portion 21 and the second recessed portion 22 in the X direction. The depth in the Z direction of the third recessed portion 24 is smaller than that of the first recessed portion 21, and larger than that of the second recessed portion 22.

Arranged in the first recessed portion 21, the second recessed portion 22, and the third recessed portion 24 are the adhesives B1, B2, and B3, respectively. The adhesives B1, B2, and B3 are applied to the first recessed portion 21, the second recessed portion 22, and the third recessed portion 24 from the +Z side of the flat plate 12 of the support member 1 with the dispenser nozzle 7 (FIG. 8), and are cured with ultraviolet irradiation. The other configuration of the lens unit 10A of the modification is the same as that of the lens unit 10 of the first embodiment.

Since the adhesives B1, B2, and B3 are arranged in the first recessed portion 21, the second recessed portion 22, and the third recessed portion 24 having different depths also in this modification, it is possible to hold the lens array 3 in the state where the twist is corrected. Note that it is also possible to provide four or more recessed portions having different depths in the support member 1.

Second Embodiment

Figure 12:
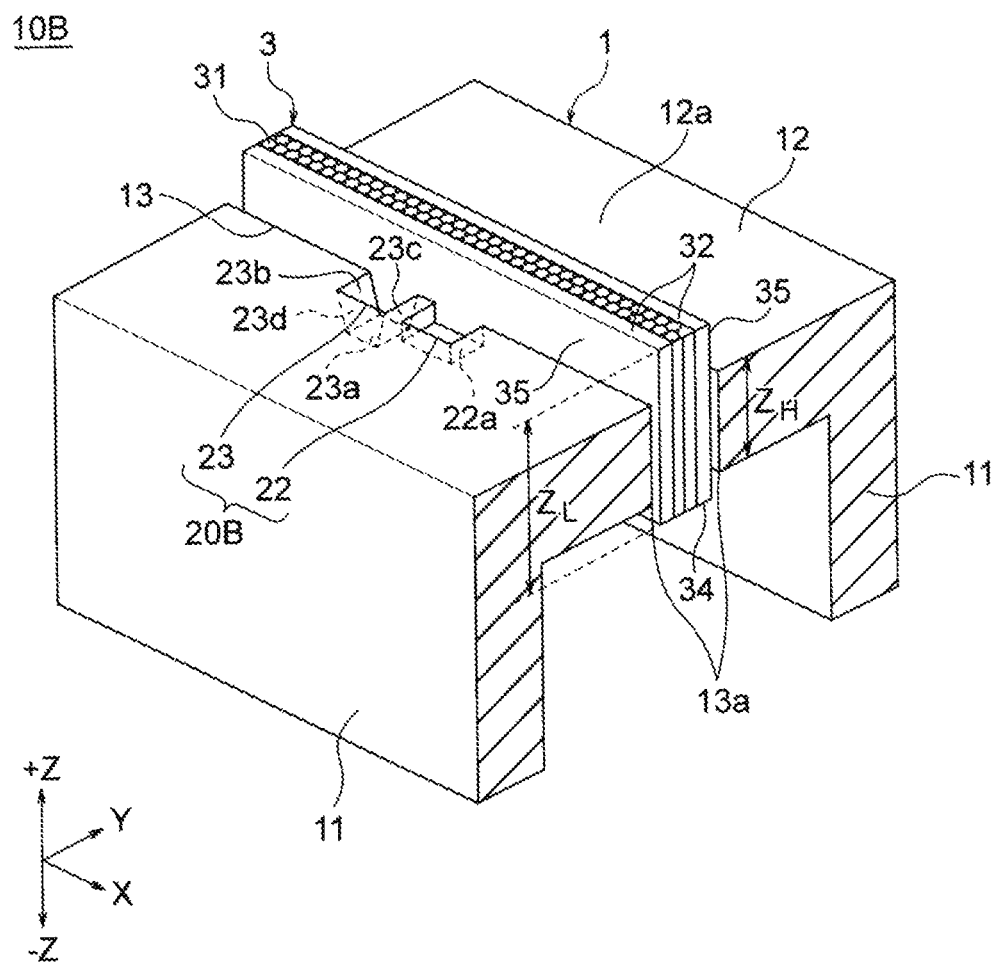
FIG. 12 is a partial cross-sectional perspective view illustrating a part of a lens unit of a second embodiment in an enlarged manner.

Next, descriptions are provided for a second embodiment. FIG. 12 is a partial cross-sectional perspective view illustrating a part of a lens unit 10B of the second embodiment in an enlarged manner.

A fixing portion 20B of the lens unit 10B of the second embodiment has a first recessed portion 23 (first adhesive holding portion) and a second recessed portion 22 (second adhesive holding portion) adjacent to each other in the X direction. The first recessed portion 23 and the second recessed portion 22 open in the top surface 12a (surface on the +Z side) of the flat plate 12, and the depth in the Z direction of the first recessed portion 23 is larger than that of the second recessed portion 22. The first recessed portion 23 and the second recessed portion 22 also open in the inner surface 13a of the insertion hole 13.

The fixing portions 20B (the first recessed portions 23 and the second recessed portions 22), like the fixing portions 20 of the first embodiment, are arranged on both sides in the Y direction of the insertion hole 13, and at multiple positions in the X direction.

The first recessed portion 23 has a bottom surface 23a located at the end in the −Z direction, a side surface 23b located at the end in the −X direction, a side surface 23c located at the end in the +X direction, and an opposing surface 23d located at the outer end in the Y direction.

In this second embodiment, the side surfaces 23b and 23c of the first recessed portion 23 are inclined with respect to the YZ plane. More specifically, the side surfaces 23b and 23c are inclined such that the distance in the X direction of these side surfaces 23b and 23c increases toward the +Z direction. In other words, the side surfaces 23b and 23c are inclined such that the width in the X direction of the first recessed portion 23 increases toward the opening (the end in the +Z direction).

The bottom surface 23a and the opposing surface 23d of the first recessed portion 23 are parallel to the XY plane and the XZ plane, respectively, like the first embodiment. The second recessed portion 22 is configured in the same way as the second recessed portion 22 in the first embodiment.

Figure 13:
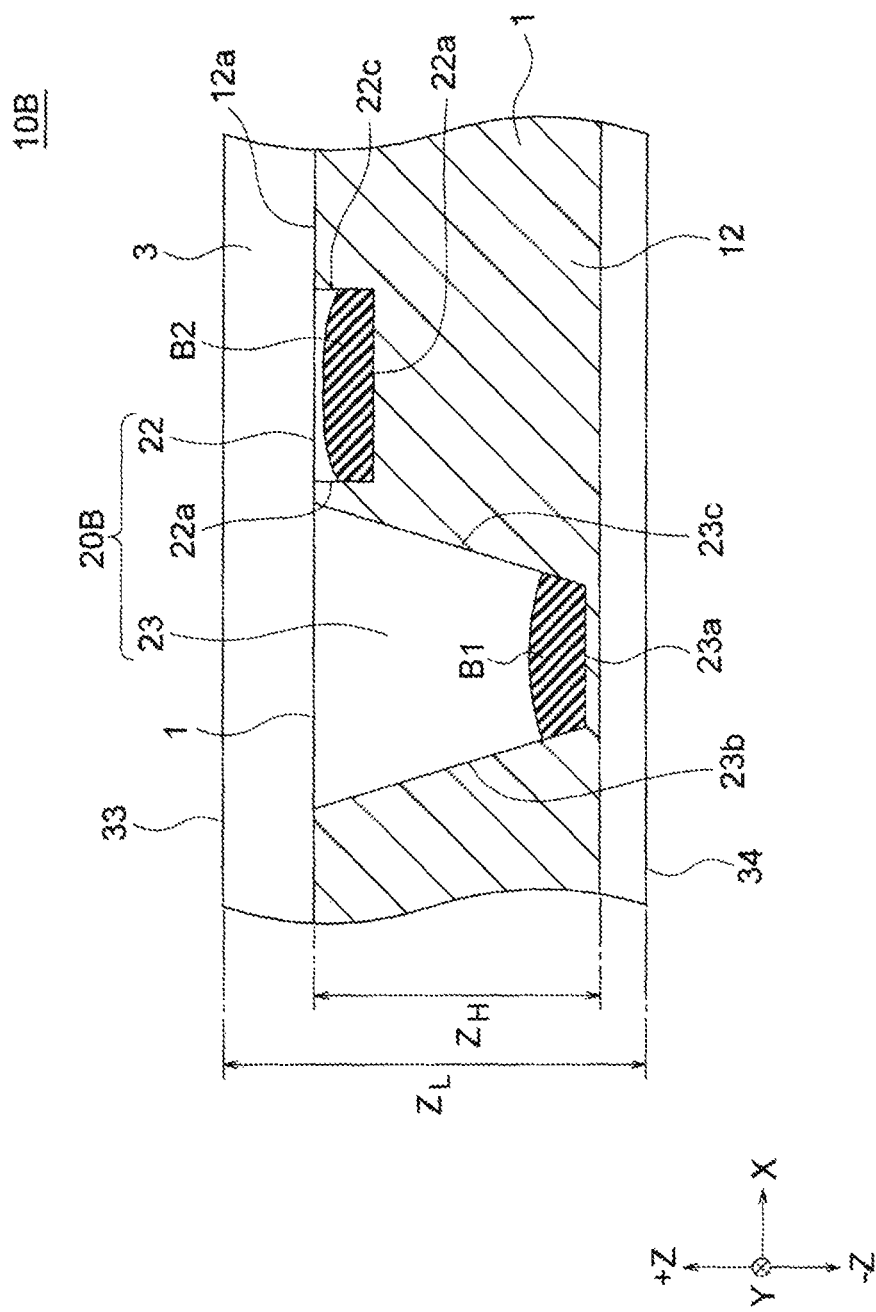
FIG. 13 is a cross-sectional view illustrating a part of the lens unit in an enlarged manner.

FIG. 13 is a cross-sectional view illustrating a part (portion including the fixing portion 20B) of the lens unit 10B of the second embodiment in an enlarged manner, taken along a plane parallel to the XZ plane. Arranged in the first recessed portion 23 and the second recessed portion 22 are the adhesives B1 and B2. The adhesives B1 and B2 are applied to the first recessed portion 23 and the second recessed portion 22 from the +Z side of the flat plate 12 of the support member 1 with the dispenser nozzle 7 (FIG. 8), and are cured with ultraviolet irradiation.

The other configuration of the lens unit 10B of the second embodiment is the same as that of the lens unit 10 of the first embodiment. The lens unit 10B of the second embodiment is assembled into the print head 100 (FIGS. 1 to 3) described in the first embodiment.

In the second embodiment, due to the inclination of the side surfaces 23b and 23c of the first recessed portion 23, the width in the X direction of the first recessed portion 23 increases toward the opening (the end on in the +Z direction). Hence, even if a highly viscous adhesive is used, the adhesive does not stay around the opening of the first recessed portion 23, and flows to the bottom surface 23a along the side surfaces 23b and 23c.

Note that the inclination angle of the side surfaces 23b and 23c is set to an angle at which the adhesive easily flows along the side surfaces 23b and 23c, based on the viscosity of the adhesive. Here, the inclination angle of the side surfaces 23b and 23c is set such that the width in the X direction at the opening (the end in the +Z direction) of the first recessed portion 23 is 3 mm.

As described above, in this second embodiment, since the width in the X direction of the first recessed portion 23 increases toward the opening (the end in the +Z direction) due to the inclination of the side surfaces 23b and 23c of the first recessed portion 23, even if a highly viscous adhesive is used, it is possible to let the adhesive positively reach the bottom surface 23a of the first recessed portion 23.

Note that although descriptions were provided here for an example where both side surfaces 23b and 23c of the first recessed portion 23 are inclined, only one of the side surfaces 23b and 23c may be inclined. Note that although descriptions were provided here for an example where the side surfaces 23b and 23c (or one of those) of the first recessed portion 23 are inclined, a configuration in which the side surfaces 22b and 22c (or one of those) of the second recessed portion 22 is inclined is also possible.

In addition, if three or more of recessed portions having different depths are provided in the support member 1 as in the modification of the first embodiment (FIG. 11), the side surfaces on both sides (or one side) in the X direction of at least the deepest recessed portion may be inclined.

Third Embodiment

Figure 14:
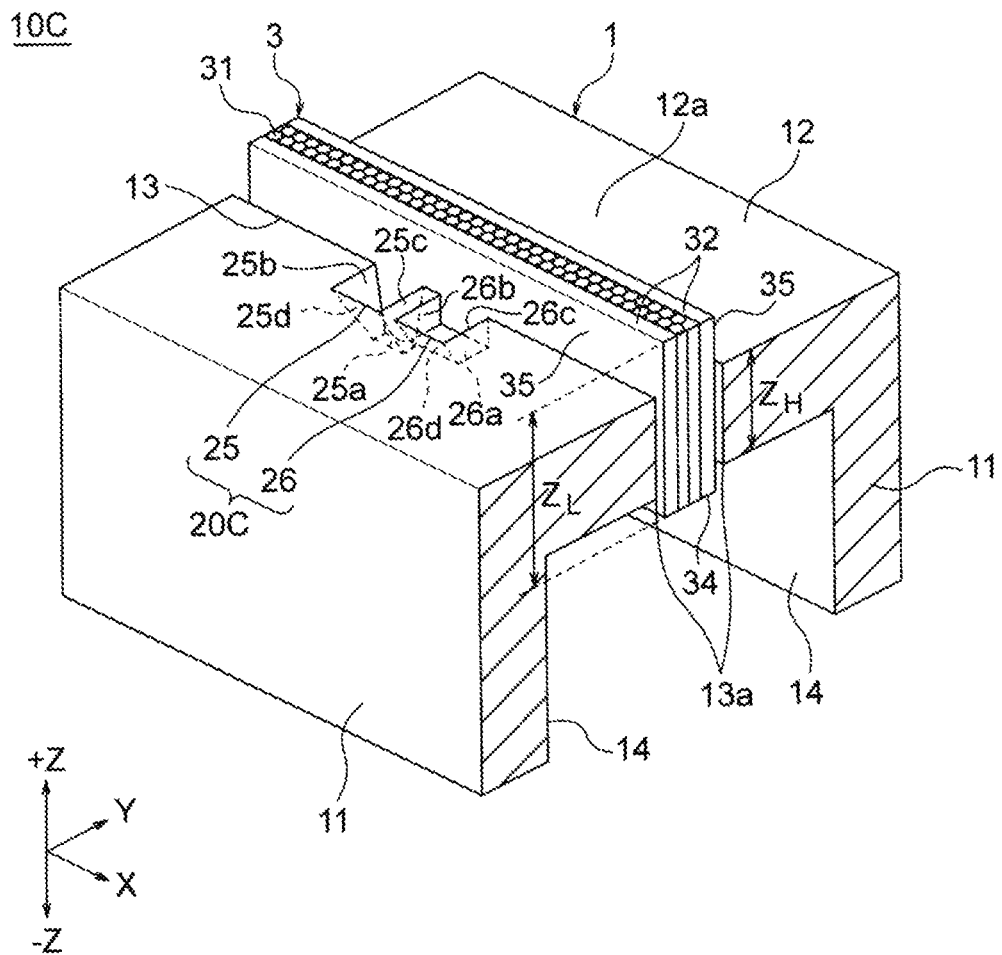
FIG. 14 is a partial cross-sectional perspective view illustrating a part of a lens unit of a third embodiment in an enlarged manner.

Next, descriptions are provided for a third embodiment. FIG. 14 is a partial cross-sectional perspective view illustrating a part of a lens unit 10C of the third embodiment in an enlarged manner.

A fixing portion 20C of the lens unit 10C of the third embodiment has a first recessed portion 25 (first adhesive holding portion) and a second recessed portion 26 (second adhesive holding portion) adjacent to each other in the X direction. The first recessed portion 25 and the second recessed portion 26 open in the top surface 12a of the flat plate 12, and the depth in the Z direction of the first recessed portion 25 is larger than that of the second recessed portion 26. The first recessed portion 25 and the second recessed portion 26 also open in the inner surface 13a of the insertion hole 13.

The fixing portions 20C (the first recessed portions 25 and the second recessed portions 26), like the fixing portions 20 of the first embodiment, are arranged on both sides in the Y direction of the insertion hole 13, and arranged at multiple positions in the X direction.

The first recessed portion 25 has a bottom surface 25a located at the end in the −Z direction, a side surface 25b located at the end in the −X direction, a side surface 25c located at the end in the +X direction, and an opposing surface 25d located at the outer end in the Y direction.

The opposing surface 25d of the first recessed portion 25 is inclined with respect to the XZ plane. More specifically, the opposing surface 25d is inclined such that the distance in the Y direction from the insertion hole 13 increases toward the +Z direction. In other words, the opposing surface 25d is inclined such that the width in the Y direction of the first recessed portion 25 increases toward the opening (the end in the +Z direction). Note that the bottom surface 25a and the side surfaces 25b and 25c of the first recessed portion 25 are parallel to the XY plane and the YZ plane, respectively, as in the first embodiment.

The second recessed portion 26 has a bottom surface 26a located at the end in the −Z direction, a side surface 26b located at the end in the −X direction, a side surface 26c located at the end in the +X direction, and an opposing surface 26d located at the outer end in the Y direction.

The opposing surface 26d of the second recessed portion 26 is inclined with respect to the XZ plane. More specifically, the opposing surface 26d is inclined such that the distance in the Y direction from the insertion hole 13 increases toward the +Z direction. In other words, the opposing surface 26d is inclined such that the width in the Y direction of the second recessed portion 26 increases toward the opening (the end in the +Z direction). Note that the bottom surface 26a and the side surfaces 26b and 26c of the second recessed portion 26 are parallel to the XY plane and the YZ plane, respectively, as in the first embodiment.

Figure 15:
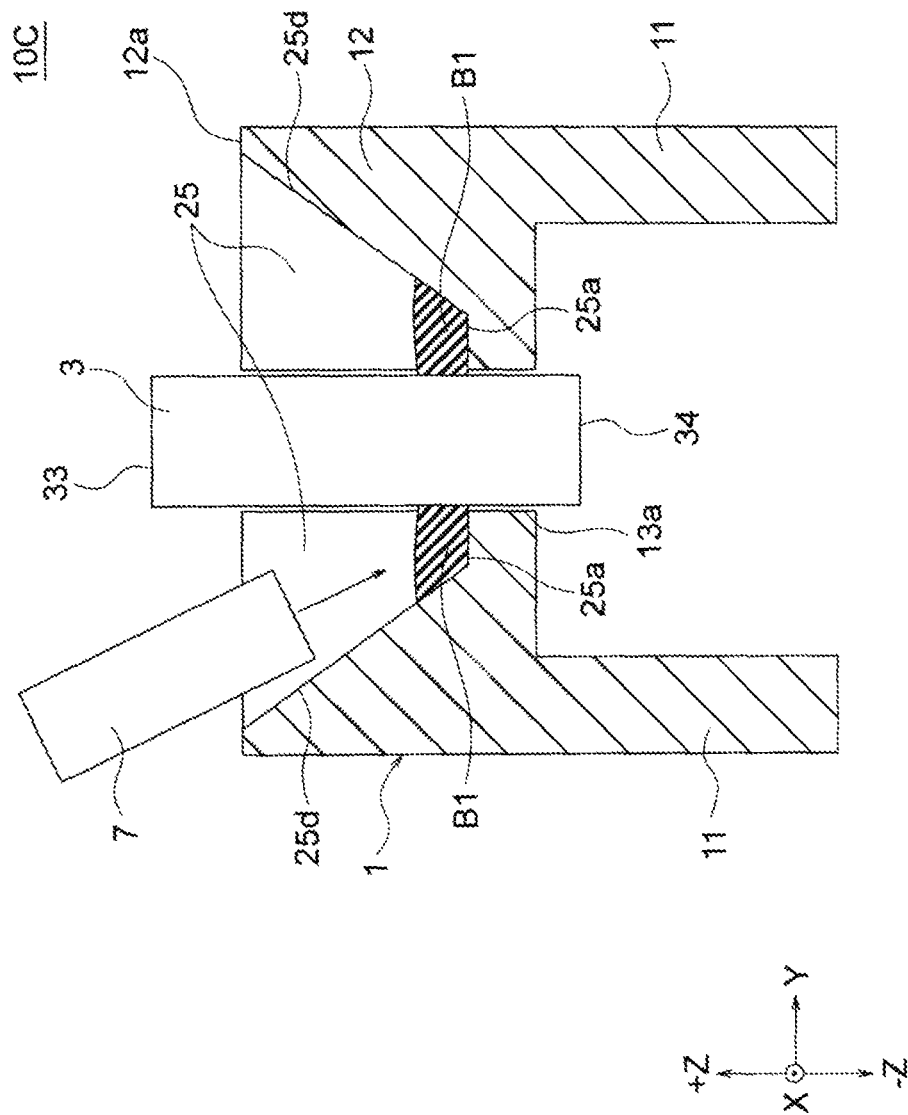
FIG. 15 is a cross-sectional view illustrating a part of the lens unit in an enlarged manner.

FIG. 15 is a cross-sectional view illustrating a part (portion including the fixing portion 20C) of the lens unit 10C in the third embodiment in an enlarged manner, taken along a plane parallel to the YZ plane. Arranged in the first recessed portion 25 and the second recessed portion 26 are adhesives B1 and B2. The adhesives B1 and B2 are applied to the first recessed portion 25 and the second recessed portion 26 from the +Z side of the flat plate 12 of the support member 1 with the dispenser nozzle 7, and are cured with ultraviolet irradiation.

The other configuration of the lens unit 10C of the third embodiment is the same as that of the lens unit 10 of the first embodiment. The lens unit 10C of the third embodiment is assembled into the print head 100 (FIGS. 1 to 3) described in the first embodiment.

In the third embodiment, due to the inclination of the opposing surface 25d of the first recessed portion 25, the width in the Y direction of the first recessed portion 25 increases toward the opening. As a result, as illustrated in FIG. 15, it is possible to apply an adhesive with the distal end of the dispenser nozzle 7 inserted into the first recessed portion 25. Thereby, it is possible to let the adhesive to positively reach the bottom surface 25a of the first recessed portion 25.

The inclination angle of the opposing surface 25d of the first recessed portion 25 is set to an angle at which the adhesive easily flows along the opposing surface 25d, and which allows the distal end of the dispenser nozzle 7 to be inserted. For example, the inclination angle of the opposing surface 25d is set such that the width in the Y direction at the opening (the end in the +Z direction) of the first recessed portion 25 is 3 mm.

Although FIG. 15 illustrates only the first recessed portion 25, since the opposing surface 26d of the second recessed portion 26 is also inclined in the same way, it is possible to insert the distal end of the dispenser nozzle 7 into the second recessed portion 26. For this reason, it is possible to let the adhesive positively reach the bottom surface 26a of the second recessed portion 26.

As described above, in this third embodiment, since the widths in the Y direction of the first recessed portion 25 and the second recessed portion 26 increase toward the openings (the ends in the +Z direction) due to the inclination of the opposing surface 25d of the first recessed portion 25 and the opposing surface 26d of the second recessed portion 26, it is possible to insert the distal end of the dispenser nozzle 7 into the first recessed portion 25 and the second recessed portion 26. Consequently, it is possible to let the adhesive positively reach the bottom surface 25a of the first recessed portion 25 and the bottom surface 26a of the second recessed portion 26.

Note that although descriptions were provided here for an example where both of the opposing surface 25d of the first recessed portion 25 and the opposing surface 26d of the second recessed portion 26 are inclined, only the opposing surface 25d of the first recessed portion 25 (the deeper recessed portion) may be inclined, for example.

In addition, in the configuration in which three or more of recessed portions having different depths are provided in the support member 1 as in the modification of the first embodiment (FIG. 11), the opposing surface (the surface located at the outer end in the Y direction) of at least the deepest recessed portion may be inclined.

As described in the second embodiment, the side surfaces 25b and 25c of the first recessed portion 25 and the side surface 26b and 26c of the second recessed portion 26 may be inclined in addition.

Fourth Embodiment

Figure 16:
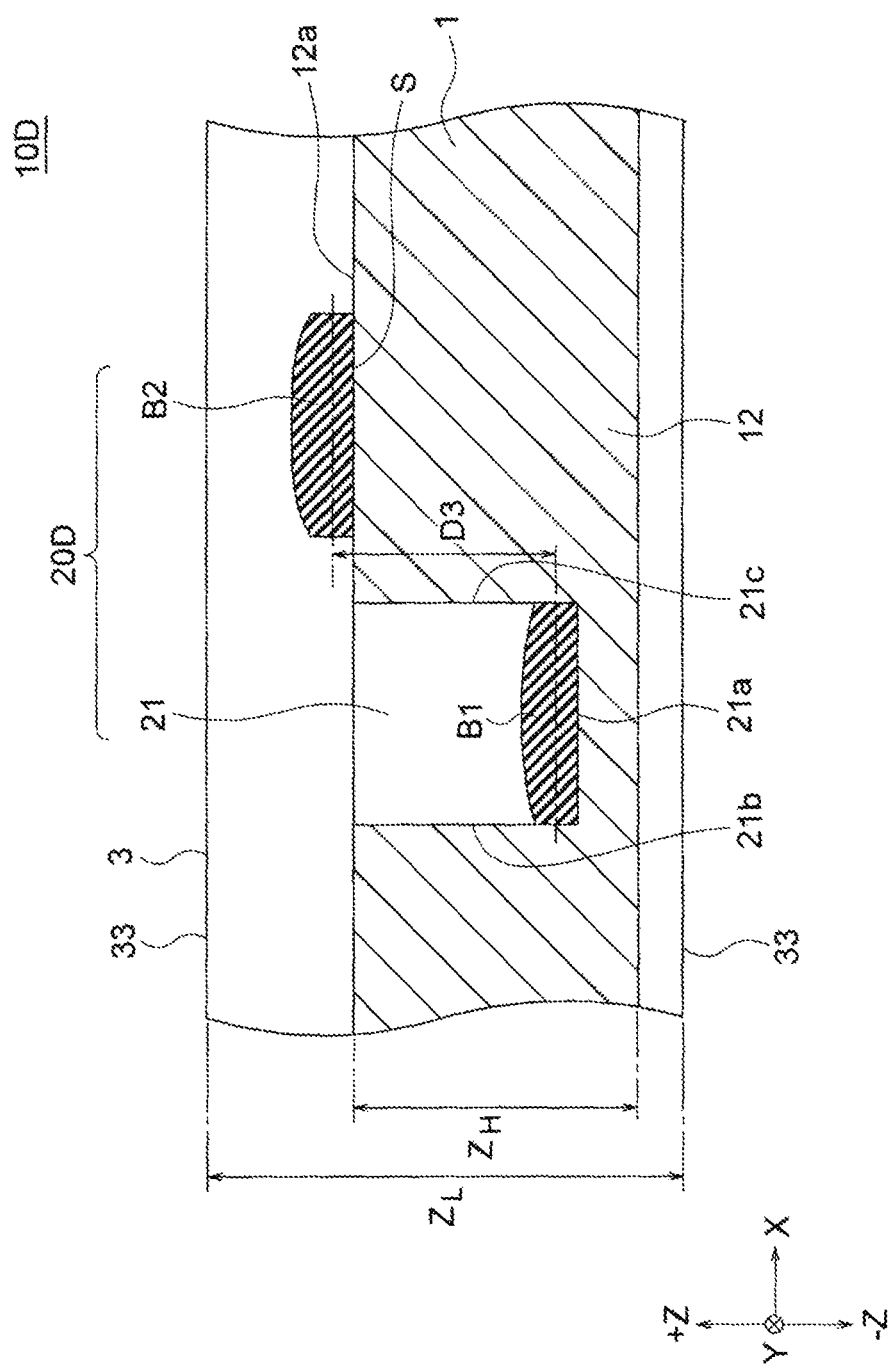
FIG. 16 is a cross-sectional view illustrating a part of a lens unit of a fourth embodiment in an enlarged manner.

Next, descriptions are provided for a fourth embodiment. FIG. 16 is a cross-sectional view illustrating a part of a lens unit 10D of the fourth embodiment in an enlarged manner, taken along a plane parallel to the XZ plane.

A fixing portion 20D of the lens unit 10D of the fourth embodiment has a first recessed portion 21 similar to that of the first embodiment (FIG. 8), but does not have a second recessed portion 22. Arranged in the first recessed portion 21 is an adhesive B1, and arranged on the top surface 12a of the flat plate 12 of the support member 1 is an adhesive B2. In other words, the fixing portion 20D of the fourth embodiment has the first recessed portion 21 and a surface area S (second adhesive holding portion) at which the adhesive B2 is arranged on the top surface 12a of the flat plate 12.

The fixing portions 20D (the first recessed portions 21 and the surface areas S) are arranged on both sides in the Y direction of the insertion hole 13, and arranged at multiple positions in the X direction, like the fixing portions 20 of the first embodiment.

The adhesives B1 and B2 are applied to the first recessed portion 21 and the surface area S on the top surface 12a of the flat plate 12 from the +Z side of the flat plate 12 of the support member 1 with the dispenser nozzle 7 (FIG. 8), and are cured with ultraviolet irradiation.

The other configuration of the lens unit 10D of the fourth embodiment is the same as that of the lens unit 10 of the first embodiment. The lens unit 10D of the fourth embodiment is assembled into the print head 100 (FIGS. 1 to 3) described in the first embodiment.

In the fourth embodiment, since the adhesive B2 is arranged on the top surface 12a of the flat plate 12, even if the dimension (thickness) $Z_H$ in the Z direction of the flat plate 12 of the support member 1 is relatively small, it is possible to make large the distance D3 in the Z direction between the adhesive B1 and the adhesive B2. As a result, it is possible to reduce the amount of a resin material used for the support member 1 to reduce the production cost.

In addition, since there is no need to form the second recessed portion 22 (FIG. 8), described in the first embodiment, in the support member 1, it is possible to further reduce the production cost.

As described above, in this fourth embodiment, since the adhesive B1 is arranged in the first recessed portion 21 of the support member 1 and the adhesive B2 is arranged on the top surface 12a of the flat plate 12 of the support member 1, it is possible to reduce the dimension $Z_H$ in the Z direction of the flat plate 12 and reduce the number of recessed portions formed on the support member 1. This reduces the production cost.

Note that, in the configuration in which three or more recessed portions having different depths are provided for the support member 1 as in the modification of the first embodiment (FIG. 11), the adhesive B2 may be arranged on the top surface 12a of the flat plate 12 of the support member 1, instead of forming the shallowest recessed portion (the second recessed portion 22 illustrated in FIG. 11).

As for the first recessed portion 21, the side surfaces 21b and 21c may be inclined as in the second embodiment, or the opposing surface 21d may be inclined as in the third embodiment.

Fifth Embodiment

Figure 17:
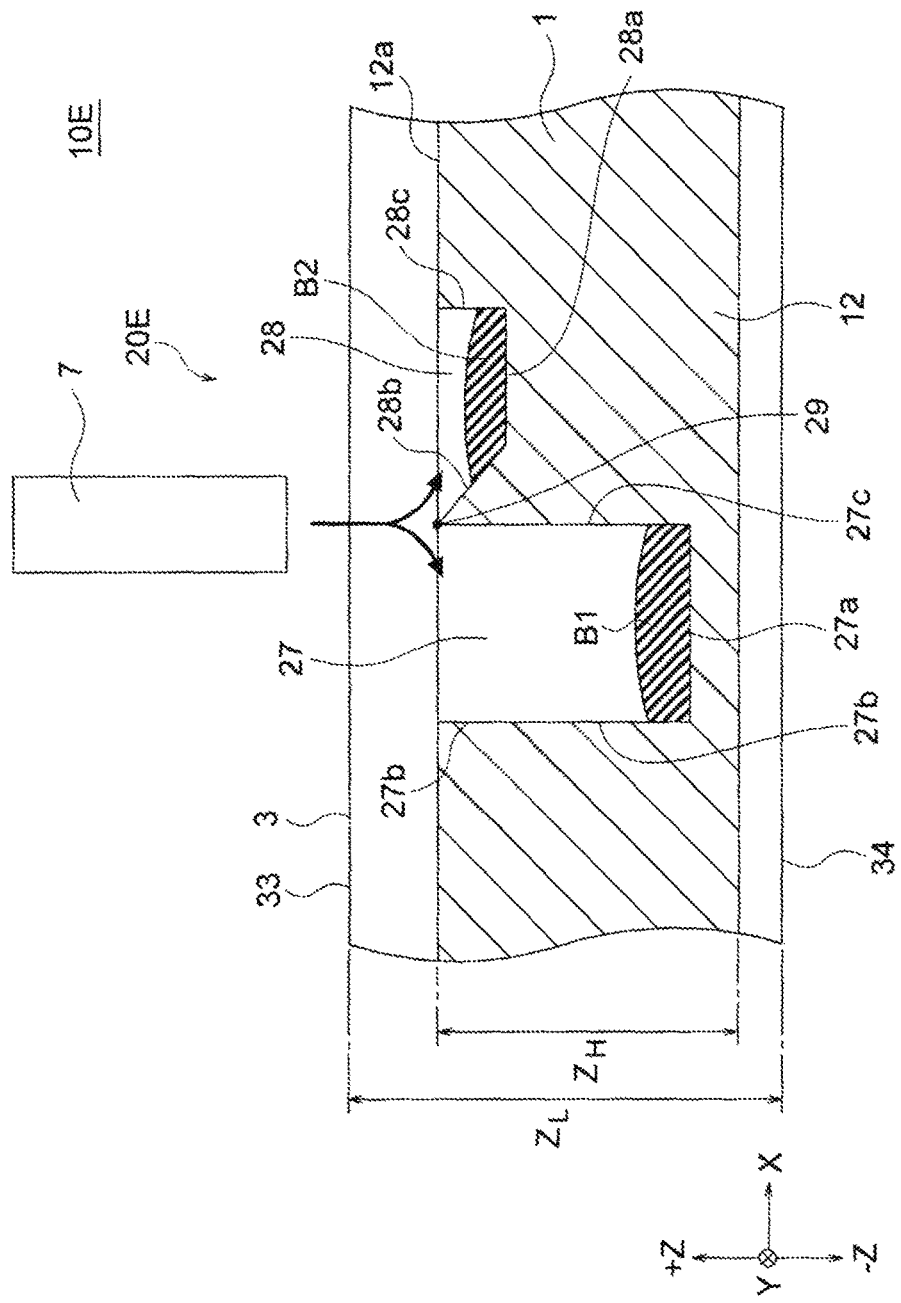
FIG. 17 is a cross-sectional view illustrating a part of a lens unit of a fifth embodiment in an enlarged manner.

Next, descriptions are provided for a fifth embodiment. FIG. 17 is a cross-sectional view illustrating a part of a lens unit 10E of the fifth embodiment in an enlarged manner, taken along a plane parallel to the XZ plane.

A fixing portion 20E of the lens unit 10E of the fifth embodiment has a first recessed portion 27 (first adhesive holding portion) and a second recessed portion 28 (second adhesive holding portion) adjacent to each other in the X direction. The first recessed portion 27 and the second recessed portion 28 open in the top surface 12a of the flat plate 12, and the depth in the Z direction of the first recessed portion 27 is larger than that of the second recessed portion 28. The first recessed portion 27 and the second recessed portion 28 also open in the inner surface 13a of the insertion hole 13 (FIG. 6).

The fixing portions 20E (the first recessed portions 27 and the second recessed portions 28), like the fixing portions 20 of the first embodiment, are arranged on both sides in the Y direction of the insertion hole 13, and arranged at multiple positions in the X direction.

The first recessed portion 27 has a bottom surface 27a located at the end in the −Z direction, a side surface 27b located at the end in the −X direction, a side surface 27c located at the end in the +X direction, and an opposing surface located at the outer end in the Y direction. The bottom surface 27a of the first recessed portion 27 is parallel to the XY plane, the side surfaces 27b and 27c are parallel to the YZ plane, and the opposing surface is parallel to the XZ plane.

The second recessed portion 28 has a bottom surface 28a located at the end in the −Z direction, a side surface 28b located at the end in the −X direction, a side surface 28c located at the end in the +X direction, and an opposing surface located at the outer end in the Y direction. The bottom surface 28a of the second recessed portion 28 is parallel to the XY plane, and the opposing surface is parallel to the XZ plane. Of the side surfaces 28b and 28c, the side surface 28c is parallel to the YZ plane, but the side surface 28b is inclined. Specifically, the side surface 28b is inclined such that the distance between the side surface 28b and the side surface 28c increases toward the +Z direction.

Due to the inclination of the side surface 28b of the second recessed portion 28, the openings (the ends in the +Z direction) of the first recessed portion 27 and the second recessed portion 28 touch each other via the ridgeline 29.

Applied to the first recessed portion 27 and the second recessed portion 28 are adhesives B1 and B2. As described in the first embodiment, the adhesives B1 and B2 are applied to the first recessed portion 27 and the second recessed portion 28 from the +Z side of the flat plate 12 of the support member 1 with the dispenser nozzle 7, and are cured with ultraviolet irradiation.

The other configuration of the lens unit 10E of the fifth embodiment is the same as that of the lens unit 10 of the first embodiment. The lens unit 10E of the fifth embodiment is assembled into the print head 100 (FIGS. 1 to 3) described in the first embodiment.

In this fifth embodiment, since the openings of the first recessed portion 27 and the second recessed portion 28 touch each other, it is possible by arranging the dispenser nozzle 7 at an intermediate position between the first recessed portion 27 and the second recessed portion 28 to apply the adhesive to both of the first recessed portion 27 and the second recessed portion 28 at the same time.

Since the first recessed portion 27 and the second recessed portion 28 are separated from each other by the portion including the ridgeline 29 of the support member 1, the portion including the ridgeline 29 of the support member 1 serves as a partition wall and prevents the adhesive applied to the second recessed portion 28 from flowing into the first recessed portion 27.

As described above, in this fifth embodiment, since the openings of the first recessed portion 27 and the second recessed portion 28 touch each other, it is possible to reduce the number of applications of the adhesive to the first recessed portion 27 and the second recessed portion 28. As a result, it is possible to reduce the time necessary for the production process and the production cost.

Note that although descriptions were provided here for an example where the side surface 28b of the second recessed portion 28 is inclined, the openings of the first recessed portion 27 and the second recessed portion 28 only need to touch each other, and the side surface 27c (side surface on the second recessed portion 28 side) of the first recessed portion 27 may be inclined. Alternatively, both the side surface 27c of the first recessed portion 27 and the side surface 28b of the second recessed portion 28 may be inclined.

In addition, if three or more of recessed portions having different depths are provided in the support member 1 as in the modification of the first embodiment (FIG. 11), the openings of at least two of the recessed portions may touch each other.

In addition, the side surfaces 27b and 27c of the first recessed portion 27 and the side surfaces 28b and 28c of the second recessed portion 28 may be inclined as in the second embodiment, or the opposing surface of the first recessed portion 27 and the opposing surface of the second recessed portion 28 may be inclined as in the third embodiment.

Sixth Embodiment

Figure 18:
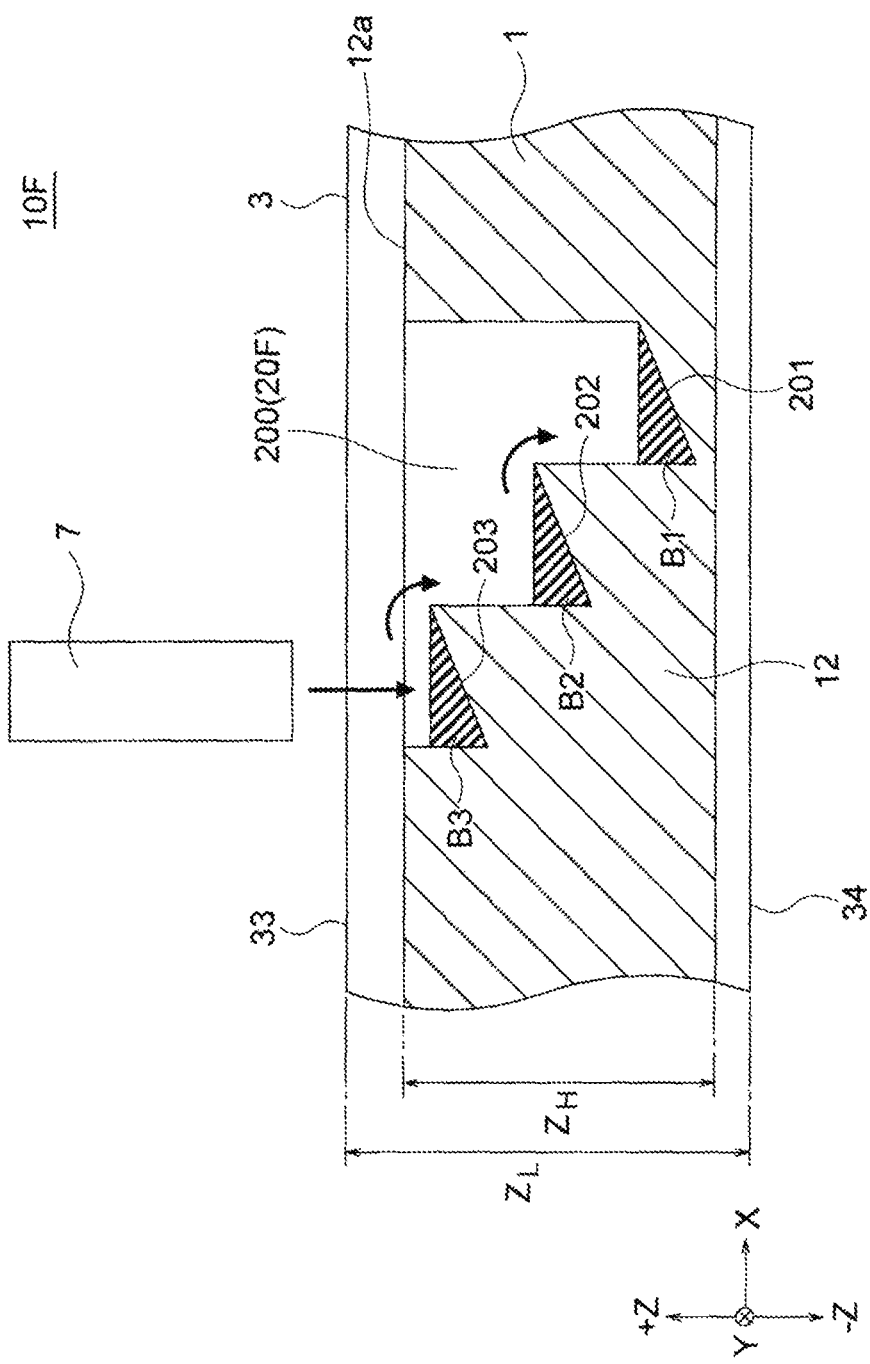
FIG. 18 is a cross-sectional view illustrating a part of a lens unit of a sixth embodiment in an enlarged manner.

Next, descriptions are provided for a sixth embodiment. FIG. 18 is a cross-sectional view illustrating a part of a lens unit 10F of the sixth embodiment in an enlarged manner, taken along a plane parallel to the XZ plane.

A fixing portion 20F of the lens unit 10F of the sixth embodiment has a single recessed portion 200. The recessed portion 200 opens in the top surface 12a of the flat plate 12 and also opens in the inner surface 13a of the insertion hole 13 (FIG. 6). From the bottom (the end in the −Z direction) of the recessed portion 200 toward the top surface 12a of the flat plate 12, steps or a stair portion including a first step portion 201 (first adhesive holding portion), a second step portion 202, and a third step portion 203 (second adhesive holding portion) are provided.

The fixing portions 20F (recessed portions 200) are arranged on both sides in the Y direction of the insertion hole 13 and arranged at multiple positions in the X direction, like the fixing portions 20 of the first embodiment.

Of the first step portion 201, the second step portion 202, and the third step portion 203 of the recessed portion 200, the depth (the distance in the Z direction) from the top surface 12a of the flat plate 12 is largest at the first step portion 201, second largest at the second step portion 202, and smallest at the third step portion 203. The first step portion 201, the second step portion 202, and the third step portion 203 are aligned in the X direction (here, in the −X direction) in this order.

The first step portion 201, the second step portion 202, and the third step portion 203 at the bottom of the recessed portion 200 are formed in a saw tooth shape. In other words, the bottom surface of the first step portion 201 is inclined to be deeper at the end of the second step portion 202 side (the end in the −X direction), and the bottom surface of the second step portion 202 is inclined to be deeper at the end of the third step portion 203 side (the end in the −X direction). The bottom surface of the third step portion 203 is inclined to be deeper at the end of the opposite side from the second step portion 202 side (the end in the −X direction). With this configuration, it is possible to hold a certain amount of adhesive on the inclined bottom surface of each of the step portions 201 to 203. Note that the bottom surface of the first step portion 201, which is the deepest, need not be inclined.

Arranged in the first step portion 201, the second step portion 202, and the third step portion 203 are the adhesives B1, B2, and B3. The adhesives B1, B2, and B3 are applied from the +Z side of the flat plate 12 of the support member 1 with the dispenser nozzle 7, and are cured with ultraviolet irradiation.

It is desirable that the adhesive B1 in the first step portion 201 and the adhesive B3 in the third step portion 203 be equidistant from the center position in the Z direction of the lens array 3 and be as far in the Z direction as possible.

The other configuration of the lens unit 10F of the sixth embodiment is the same as that of the lens unit 10 of the first embodiment. The lens unit 10F of the sixth embodiment is assembled into the print head 100 (FIGS. 1 to 3) described in the first embodiment.

This sixth embodiment makes it possible to hold the lens array 3 in the state where the twist is corrected, with the adhesives B1, B2, and B3 applied in the first step portion 201, the second step portion 202, and the third step portion 203 at the bottom of the recessed portion 200.

At the application of the adhesive to the recessed portion 200, when the dispenser nozzle 7, located above the third step portion 203, drops (applies) the adhesive, the adhesive first accumulates on the third step portion 203, and then overflowing adhesive flows to the second step portion 202. The adhesive that flowed to the second step portion 202 accumulates on the second step portion 202, and the overflowing adhesive flows to the first step portion 201, and also accumulates on the first step portion 201.

In this way, it is possible to apply the adhesives B1, B2, and B3 to the first step portion 201, the second step portion 202, and the third step portion 203 without moving the dispenser nozzle 7. This simplifies the adhesive application process.

In addition, it is possible to cure the adhesives B1, B2, and B3 at the same time by irradiating the adhesives B1, B2, and B3 with ultraviolet rays. This sixth embodiment is particularly effective when an ultraviolet curable adhesive having a relatively low viscosity is used.

As described above, in this sixth embodiment, since the support member 1 has the recessed portion 200 having the stair portion (the first step portion 201, the second step portion 202, and the third step portion 203) at the bottom, it is possible to simplify the process of applying the adhesive. As a result, it is possible to reduce the time necessary for the production process and the production cost.

Note that although the stair portion at the recessed portion 200 here has three steps (the first step portion 201, the second step portion 202, and the third step portion 203), the number of steps is not limited to three, but it may be two, or four or more.

<Image Formation Apparatus>

Next, descriptions are provided for an image formation apparatus 90 (LED printer) including a print head 100, having a lens unit described in the embodiments, as an exposure apparatus.

FIG. 19 is a schematic diagram illustrating the basic configuration of the image formation apparatus 90. The image formation apparatus 90 forms color images using an electrophotographic method. The image formation apparatus 90 includes process units (image formation units) 80Y, 80M, 80C, and 80K that form images of yellow (Y), magenta (M), cyan (C), and black (K). The process units 80Y, 80M, 80C, and 80K are aligned in a row along the conveyance path of recording mediums 9 from the upstream side to the downstream side (here, right to left).

Above the process units 80Y, 80M, 80C, and 80K, print heads 100Y, 100M, 100C, and 100K as exposure apparatuses are arranged to face respective photosensitive drums 81. Each of the print heads 100Y, 100M, 100C, and 100K exposes the surface of the photosensitive drum 81 based on image data for each color to form an electrostatic latent image.

Provided at a lower part of the image formation apparatus 90 are a medium cassette 91 as a medium accommodation unit to accommodate the recording mediums 9 and a hopping roller 92 that sends out the recording mediums 9 (for example, printing papers) accommodated in the medium cassette 91 one by one to the conveyance path (indicated by a dot-and-dash line). Arranged along the conveyance path of the recording medium 9 sent out from the medium cassette 91 are a pair of registration rollers 93 that convey the recording medium 9 while correcting the skew and a pair of conveyance rollers 94 that further convey the recording medium 9 toward the process units 80Y, 80M, 80C, and 80K.

Since the process units 80Y, 80M, 80C, and 80K have a common configuration except for the toner used therein, those are referred to as the "process units 80" in the following description. In addition, the print heads 100Y, 100M, 100C, and 100K are referred to as the "print heads 100".

Each process unit 80 includes a photosensitive drum 81 as an electrostatic latent image carrier, a charge roller 82 as a charge member, a development roller 83 as a developer carrier (development unit), a supply roller 84 as a developer supply member, a development blade 85 as a developer regulation member, and a toner cartridge 86 as a developer container.

The photosensitive drum 81 is a metal cylindrical member with a photosensitive layer (a charge generation layer and a charge transport layer) formed on the surface. The photosensitive drum 81 rotates clockwise in the figure by a driving mechanism including a non-illustrated driving source and gear train.

The charge roller 82, arranged to be in contact with the photosensitive drum 81, rotates being driven by the photosensitive drum 81. The charge roller 82, to which a charge voltage is applied, charges the surface of the photosensitive drum 81 uniformly. The development roller 83, arranged to be in contact with the photosensitive drum 81, rotates in a direction opposite to that of the photosensitive drum 81 (that is a direction in which the surfaces at the contact portion move in the same direction). The development roller 83, to which a development voltage is applied, attaches toner (developer) to an electrostatic latent image formed on the surface of the photosensitive drum 81 to develop, and forms a toner image (developer image).

The supply roller 84, arranged to be in contact with (or to face) the development roller 83, rotates in the same direction as that of the development roller 83. The supply roller 84, to which a supply voltage is applied, supplies the development roller 83 with the toner supplied from the toner cartridge 86.

The development blade 85, formed by bending a metal plate member, presses the bent portion to the surface of the development roller 83. The development blade 85 regulates the thickness of the toner layer on the surface of the development roller 83. The toner cartridge 86, detachably attached to the process unit 80, contains toner. The toner cartridge 86 supplies the development roller 83 and the supply roller 84 with the toner.

Below each process unit 80, a transfer roller 88 as a transfer member is arranged to face the photosensitive drum 81. The transfer roller 88 is made by forming a semi conductive rubber layer on a shaft. The transfer roller 88, to which a transfer voltage is applied, transfers the toner image on the surface of the photosensitive drum 81 to a recording medium 9 passing between the photosensitive drum 81 and the transfer roller 88.

In the conveyance direction of the recording medium 9, arranged downstream of the process units 80Y, 80M, 80C, and 80K (on the left side in the figure) is a fuser unit 95. The fuser unit 95 includes a fuser roller 95a and a pressure roller 95b which fuse the toner image transferred to the recording medium 9 onto the recording medium 9 with heat and pressure.

Downstream of the fuser unit 95 in the conveyance direction of the recording medium 9, pairs of discharge rollers 96 and 97 are provided for discharging the recording medium 9, on which the fusing is completed, to the outside of the image formation apparatus 90. In addition, provided at an upper portion of the image formation apparatus 90 is a stacker 98 where the discharged recording mediums 9 are placed.

Note that the image formation apparatus 90 is provided with a duplex print unit 99 (indicated by the broken lines in FIG. 19) which, in the double-sided printing mode, reverses the front and back sides of the recording medium 9, in which transferring and fusing of toner images to the surface is completed, and conveys it to the pair of registration rollers 93. Description of this duplex print unit 99 is omitted.

The basic operation of the image formation apparatus 90 is as follows. When receiving a print command and print data from a host apparatus such as a personal computer, the image formation apparatus 90 starts image formation operation. First, the hopping roller 92 rotates and sends out the recording mediums 9 accommodated in the medium cassette 91 one by one to the conveyance path. The recording medium 9 sent out onto the conveyance path is conveyed to the process units 80Y, 80M, 80C, and 80K by the pair of registration rollers 93 and the pair of conveyance rollers 94.

In each process unit 80, after the surface of the photosensitive drum 81 is uniformly charged by the charge roller 82, the surface of the photosensitive drum 81 is exposed by the print head 100, and an electrostatic latent image is formed. The toner supplied from the toner cartridge 86 is supplied to the development roller 83 by the supply roller 84, and a toner image with a uniform thickness is formed on the surface of the development roller 83 by the development blade 85. The electrostatic latent image formed on the surface of the photosensitive drum 81 is developed by the development roller 83 to be a toner image. The toner image formed on the surface of the photosensitive drum 81 is transferred to the recording medium 9 passing between the photosensitive drum 81 and the transfer roller 88. By the recording medium 9 passing through the process units 80Y, 80M, 80C, and 80K, toner images of yellow, magenta, cyan and black are transferred onto the surface of the recording medium 9.

The recording medium 9 onto which the toner images have been transferred is conveyed to the fuser unit 95, where heat and pressure are applied by the fuser roller 95a and the pressure roller 95b, and the toner images are fused on the recording medium 9. The recording medium 9 on which the toner images have been fused is discharged to the outside of the image formation apparatus 90 by the pair of discharge rollers 96 and 97 and stacked on the stacker 98. With this, the image formation operation is completed.

The print heads 100 described in the above embodiments 1 to 6 can be downsized without deteriorating the optical performance. Accordingly, the application of the print heads 100 to the image formation apparatus 90 makes possible downsizing and cost reduction of the image formation apparatus 90.

Note that the image formation apparatus 90 illustrated in FIG. 19 is a mere example. The invention may be applied to an image formation apparatus that forms monochrome images (such as monochrome printers), or may be applied to an image formation apparatus of an intermediate transfer type using an intermediate transfer body. Examples of the image formation apparatuses include printers, copy machines, facsimile apparatuses, and multifunction peripherals.

Although the desirable embodiments have been concretely described above, the invention is not limited to the above embodiments. Various improvements or modifications can be made without departing from the gist of the invention.

The invention claimed is:

1. A lens unit comprising:
    a lens array that includes lens elements each provided with an optical axis and extends in a first direction;
    a support member that supports the lens array; and
    an adhesive that bonds the lens array and the support member, wherein
    the support member includes: a first adhesive holding portion including a first opening end and a first bottom surface with a first depth from the first opening end in a direction of the optical axis; and a second adhesive holding portion including a second opening end and a second bottom surface with a second depth from the second opening end in the direction of the optical axis, wherein the second depth of the second adhesive holding portion is less than the first depth of the first adhesive holding portion,
    the first adhesive holding portion and the second adhesive holding portion are arranged in the first direction,
    the adhesive is provided in the first adhesive holding portion and the second adhesive holding portion, and
    a first distance between the first opening end of the first adhesive holding portion and the adhesive in the first adhesive holding portion is greater than a second distance between the second opening end of the second adhesive holding portion and the adhesive in the second adhesive holding portion.

2. The lens unit according to claim 1, wherein
    the first adhesive holding portion includes first adhesive holding portions arranged at multiple positions in the first direction, and
    the second adhesive holding portion is arranged between adjacent two of the first adhesive holding portions in the first direction.

3. The lens unit according to claim 1, wherein
    the second adhesive holding portion includes second adhesive holding portions arranged at multiple positions in the first direction, and the first adhesive holding portion is arranged between adjacent two of the second adhesive holding portions in the first direction.

4. The lens unit according to claim 1, wherein
the first adhesive holding portion includes first adhesive holding portions, wherein at least a pair of the first adhesive holding portions face each other with the lens array interposed in between in a second direction orthogonal to both the first direction and the optical axis, and
the second adhesive holding portion includes second adhesive holding portions, wherein at least a pair of the second adhesive holding portions face each other with the lens array interposed in between in the second direction.

5. The lens unit according to claim 1, wherein
a center position of the lens array in the direction of the optical axis is positioned between a bonding position of the adhesive at the first adhesive holding portion and a bonding position of the adhesive at the second adhesive holding portion, in the direction of the optical axis.

6. The lens unit according to claim 1, wherein
the first adhesive holding portion and the second adhesive holding portion are arranged within 10 mm in the first direction.

7. The lens unit according to claim 1, wherein
in the direction of the optical axis, a bonding position of the adhesive at the first adhesive holding portion and a bonding position of the adhesive at the second adhesive holding portion are apart from each other by at least half the length of the lens array in the direction of the optical axis.

8. The lens unit according to claim 1, wherein
the first adhesive holding portion is a first recessed portion with the first depth,
the second adhesive holding portion is a second recessed portion with the second depth, and
the first recessed portion and the second recessed portion include the first opening end and the second opening end, respectively, at an upper surface of the support member.

9. The lens unit according to claim 1, wherein
the first adhesive holding portion is a first recessed portion with the first depth,
the second adhesive holding portion is a second recessed portion with the second depth, and
the first recessed portion and the second recessed portion are arranged to touch each other in the first direction.

10. The lens unit according to claim 1, wherein
the first adhesive holding portion is a first recessed portion, and
the second adhesive holding portion is a part of a surface of the support member.

11. The lens unit according to claim 1, wherein
the first bottom surface of the first adhesive holding portion, the second bottom surface of the second adhesive holding portion, and a connecting surface provided between and connecting the first bottom surface of the first adhesive holding portion and the second bottom surface of the second adhesive holding portion form a step portion.

12. The lens unit according to claim 11, wherein
the second bottom surface of the second adhesive holding portion is inclined such that a depth of the second adhesive holding portion from an upper surface of the support member increases as the second adhesive holding portion extends farther away from the connecting surface in the first direction.

13. The lens unit according to claim 1, wherein
the adhesive is an ultraviolet curable adhesive.

14. An optical head, comprising:
the lens unit according to claim 1; and
a substrate including an optical element facing the lens unit.

15. The optical head according to claim 14, wherein:
the optical element is a light emitting diode or a light emitting thyristor.

16. An image formation apparatus comprising:
the optical head according to claim 14;
an image carrier on which a latent image is formed by light exposure by the optical head; and
a development unit that develops the latent image.

17. A lens unit comprising:
a lens array that includes lens elements each provided with an optical axis and extends in a first direction;
a support member that supports the lens array; and
an adhesive that bonds the lens array and the support member, wherein
the support member includes a first adhesive holding portion with a first depth in a direction of the optical axis and a second adhesive holding portion shallower than the first adhesive holding portion,
the first adhesive holding portion and the second adhesive holding portion are arranged in the first direction,
the adhesive is provided at the first adhesive holding portion and the second adhesive holding portion,
the first adhesive holding portion and the second adhesive holding portion include openings at a surface of the support member, and
at least one of side surfaces of the first adhesive holding portion in the first direction is inclined so that a width of the first adhesive holding portion in the first direction increases toward the opening of the first adhesive holding portion in the direction of the optical axis.

18. The lens unit according to claim 17, wherein
the width in the first direction of the opening of the first adhesive holding portion is 3 mm or more.

19. A lens unit comprising:
a lens array that includes lens elements each provided with an optical axis and extends in a first direction;
a support member that includes a first surface and a second surface opposite to the first surface in a direction of the optical axis and that supports the lens array; and
an adhesive that bonds the lens array and the support member, wherein
the support member includes: a first adhesive holding portion including a first opening end and a first bottom surface with a first depth from the first opening end in the direction of the optical axis; and a second adhesive holding portion including a second opening end and a second bottom surface with a second depth from the second opening end in the direction of the optical axis, wherein the second depth of the second adhesive holding portion is less than the first depth of the first adhesive holding portion,
the first adhesive holding portion and the second adhesive holding portion are arranged in the first direction,
the adhesive is provided in the first adhesive holding portion and the second adhesive holding portion,
the first opening end and the second opening end are provided at the first surface of the support member, and a material of the adhesive in the first adhesive holding portion and a material of the adhesive in the second adhesive holding portion are the same and are ultraviolet curable adhesive.

\* \* \* \* \*